United States Patent
Tsutsui et al.

[11] Patent Number: 6,068,576
[45] Date of Patent: May 30, 2000

[54] HYDRAULIC CONTROL SYSTEM FOR AUTOMATIC TRANSMISSION

[75] Inventors: Hiroshi Tsutsui; Takao Taniguchi; Kazumasa Tsukamoto; Masaaki Nishida; Yoshihisa Yamamoto; Masao Saito; Takayuki Kubo; Akitomo Suzuki, all of Anjo, Japan

[73] Assignee: Aisin AW Co., Ltd., Japan

[21] Appl. No.: 09/145,888

[22] Filed: Aug. 2, 1998

[30] Foreign Application Priority Data

Sep. 4, 1997 [JP] Japan ................................ 9-240080
Mar. 25, 1998 [JP] Japan ................................ 10-077988

[51] Int. Cl.$^7$ ................................................ F16H 61/04
[52] U.S. Cl. ................................ 477/144; 477/132
[58] Field of Search ............................ 477/132, 133, 477/144, 148, 149

[56] References Cited

U.S. PATENT DOCUMENTS

| | | | |
|---|---|---|---|
| 5,046,174 | 9/1991 | Lentz et al. | 477/144 X |
| 5,445,579 | 8/1995 | Fujita et al. | 477/132 X |
| 5,800,309 | 9/1998 | Takiguichi et al. | 477/144 |
| 5,888,170 | 3/1999 | Takiguichi et al. | 477/144 X |

FOREIGN PATENT DOCUMENTS

| | | |
|---|---|---|
| 566399 | 10/1993 | European Pat. Off. . |
| 583954 | 2/1994 | European Pat. Off. . |
| 780602 | 6/1997 | European Pat. Off. . |

*Primary Examiner*—Sherry L. Estremsky
*Attorney, Agent, or Firm*—Lorusso & Loud

[57] ABSTRACT

When a vehicle driving state of an automatic transmission is changed to a power-off state from a power-on state during a down shift involving the disengagement of one friction element and the engagement of another friction element, a disengagement side pressure PA is reduced rapidly by a feedback control based on the change in gear ratio because of a reduction of an input torque. The disengagement side pressure control is unable to complete change of the gear ratio to complete the down shift. When the disengagement side pressure is reduced to a value less than a return spring load pressure PG or when the gear ratio change has not achieved a basic value in a predetermined time, the down shift control is changed from primary control by the disengagement side pressure control to primary control by an engagement side control so that the gear ratio change is completed by control of the engagement side pressure.

29 Claims, 24 Drawing Sheets

FIG. 3

|   | C1 | C2 | C3 | B1 | B2 | B3 | B4 | B5 | F1 | F2 |
|---|---|---|---|---|---|---|---|---|---|---|
| N |   |   |   |   |   |   |   | O |   |   |
| 1ST | O |   |   |   |   | ◌ |   | O |   | O |
| 2ND | O |   |   | ☐ | O |   |   | O | O |   |
| 3RD | O |   |   | O | O |   | O |   | O |   |
| 4TH | O |   | O | O | O |   |   |   | O |   |
| 5TH | O | O | O |   | O |   |   |   |   |   |
| 3Low | O | O |   |   | O |   |   | O |   |   |
| 4Low | O | O |   |   | O |   | O |   |   |   |
| REV |   | O |   |   |   | O |   | O |   |   |

◌ : ENGINE BRAKE    ☐ : OPERATED WITH NECESSITY

FLOW CHART FOR DISENGAGEMENT SIDE IN DOWN SHIFT

FLOW CHART FOR ENGAGEMENT SIDE IN DOWN SHIFT

TIME tw FOR DISENGAGEMENT SIDE WAITING CONTROL IS
CHANGED BASED ON INPUT TORQUE

TIME t1 FROM A TIME DISENGAGEMENT SIDE PRESSURE
DECREASES LOWER THAN SPRING LOAD PRESSURE PG IS
CHANGED BASED ON INPUT TORQUE

FLOW CHART FOR DISENGAGEMENT SIDE IN DOWN SHIFT

HYDRAULIC CONTROL SYSTEM FOR AUTOMATIC TRANSMISSION

BACKGROUND OF THE INVENTION

1. Field of the Invention

The invention relates to a hydraulic control system for an automatic transmission in an automobile, and particularly, to facilities for controlling a down shift operation in such a hydraulic control system.

2. Description of the Related Art

In general, driving states of a moving vehicle can be classified into various different states such as a power-on state in which an accelerator pedal is depressed commanding transmission of torque from an engine to vehicle wheels, a power-off state in which the accelerator pedal is released commanding cessation of transmission of torque from the engine to the vehicle wheels, and further, a high speed driving state and a low speed driving state. Shift control in an automatic transmission is based on the vehicle driving state. For example, a down shift during the power-on state, commonly called a kick down shift, is performed by further depressing the accelerator pedal (throttle opening is increased), while a down shift in a power-off state is performed during reduction of the vehicle speed after the accelerator pedal is released (throttle opening is decreased).

A hydraulic shift procedure generally includes the engagement of a frictional element with the simultaneous disengagement of another frictional element, for example, the clutch to clutch shift operation described in Japanese patent publication Laying-Open No. Hei 4-210158. In this procedure the presence of a power-on state or a power-off state is detected, and based on the detected result, a down shift is performed by control logic set for the respective state. In the event that the vehicle driving state is changed to the power-on state by depressing the accelerator pedal during a downshift procedure under power-off control, it is determined to continue the downshift using the power-off control logic or to continue the downshift using the power-on control logic based on the hydraulic pressure for the disengaging frictional element.

More specifically, detection of the throttle opening is used to determine the power-on state or the power-off state. If the hydraulic pressure on the disengaging frictional element (off pressure command) is zero when the change to the power-on state from the power-off state is detected, the control logic for the power-off state is discontinued and the control logic for the power-on state is used. If the hydraulic pressure on the disengaging frictional element is not zero (hydraulic pressure still remains), the control logic for the power-off state is continued with the hydraulic pressure on the engaging frictional element increasing until the down shift procedure ends.

In conventional hydraulic controls, control in the power-on state and control in the power-off state are performed with different respective control logic. Therefore, for example, when the accelerator pedal is released during the operation of a down shift in the power-on state, the down shift is performed with the control logic for the power-on state. The power-on state control logic performs the down shift by decreasing the hydraulic pressure on the disengaging frictional element so that the rotational speed of the input shaft speed is normally increased to a synchronized rotation speed after the shift. However when the driving state has changed from the power-on state to the power-off state, the rate of increase of the input shaft rotation speed is low because the accelerator pedal is released and motor torque is low. Even though the decrease in hydraulic pressure on the disengaging frictional element is made quickly in an attempt to compensate for the low rate of increase in input shaft rotation speed, the input shaft rotation speed is not increased to the required synchronizing rotation speed. Therefore, it is necessary to increase the input shaft rotation speed by increasing the hydraulic pressure on the engaging frictional element.

However, increase in the hydraulic pressure on engaging frictional element by the power-on state logic is generally delayed, that is, the hydraulic pressure on the engaging frictional element is maintained at a low pressure until the input rotation speed is increased to about the synchronized rotation speed so as to prevent a tie-up with the disengaging frictional element. Therefore, the hydraulic pressure on the engaging frictional element is increased at a relatively low rate. As a result, the time required for a down shift is excessively long.

In one type of automatic transmission, as shown in FIG. 24, the gear ratios can be manually shifted to produce a feeling of a manual shift transmission by structuring the shift lever 100 to be movable to operating positions calling for different transmission ratios such as a first ratio, a second ratio, a third ratio, and a fourth ratio while in the D range of the automatic transmission. In the normal D range of an automatic transmission, the excessive delay in the down shift caused by a change from the power-on to the power-off state (for example, when a kick down shift is interrupted by release of the accelerator pedal) can be prevented by changing control of the transmission to an up shift mode. But if the down shift is being performed in response to movement of the manual shift lever, it is impossible to change to the up shift mode because of the manual demand for a down shift such as a shift from fourth ratio to third ratio. Therefore, the delay in the down shift cannot be prevented by discontinuing the down shift operation.

In a down shift in an automatic transmission in which a one-way clutch operates, the engaging frictional element is connected in parallel with the one-way clutch in the power-off state for performing an engine brake operation after the down shift. In this structure during a manual down shift in the power off state, a time lag occurs during the down shift and it is difficult to achieve a proper feel of the down shift at all vehicle speeds.

SUMMARY OF THE INVENTION

Therefore, an object of the invention is to provide a hydraulic control system for an automatic transmission which performs a shift control with the same control logic for different vehicle driving states such as a power-on state and a power-off state, and further, which prevents excessive delays in performing shift operations when an accelerator pedal is released in the power-on state.

In order to achieve the aforementioned object, a hydraulic control system for an automatic transmission having an input shaft receiving power from an engine output shaft, an output shaft connected to vehicle wheels, and a plurality of frictional elements that change power transmission ratios between the input shaft and the output shaft includes hydraulic servos that engage and disengage the frictional engagement elements, a hydraulic controller which controls hydraulic pressures applied to the hydraulic servos, and a control unit which receives input signals from sensors based on a vehicle driving state and outputs hydraulic control signals to the hydraulic controller. The control unit comprises a disengagement controller which controls hydraulic pressure applied to a hydraulic servo for a frictional element being disengaged in a down shift to a predetermined gear ratio, an engagement controller which controls hydraulic pressure applied to a hydraulic servo for a frictional element being engaged in the down shift to the predetermined gear ratio, a shift process detector which detects a progress of the down shift based on the inputs from the sensors, and a change determiner which changes primary control of the down shift to the engagement controller from the disengagement controller when it is determined that the progress of the down shift being performed by the primary control of the disengagement controller means is less than a predetermined progress.

The shift process detector detects the progress of the down shift based on an amount of change in one or more input signals from sensor monitoring the progress of the down shift, and the change determiner determines that the predetermined progress is not achieved when the hydraulic pressure applied to the hydraulic servo for the disengagement side frictional engagement element is less than a predetermined pressure or that the change amount has not achieved a basic value.

The shift process detector detects the progress circumstances of the down shift based on an amount of change in input signals monitoring the progress of the down shift, and the change determiner determines that predetermined progress circumstances are not achieved when a predetermined time has elapsed from a shift control start and the amount of change in the input signals has not achieved a basic value.

The disengagement side controller performs a control which calculates the hydraulic pressure applied to the hydraulic servo for the disengagement side frictional engagement element based on an input torque.

The amount of change monitored during the progress of the down shift is the amount of change of the input rotational speed relative to the output rotational speed (rear ratio).

The disengagement side controller performs a feedback control which controls the hydraulic pressure applied to the hydraulic servo for the disengagement side frictional engagement element based on the amount of change monitored in the progress of the down shift.

The engagement side controller performs an engagement control in which the hydraulic pressure increases to a target engagement pressure calculated based on a torque allotted by the engagement side frictional engagement element, and performs an end phase control which is started when the amount of change in the progress of the down shift achieves a predetermined value is corresponding to the start of the end phase control.

The engagement side controller performs a feedback control based on an amount of change of the input rotation speed relative to the output rotation speed when the change determiner changes so that the down shift is controlled mainly by the engagement side controller.

The disengagement side controller performs a waiting control in which the disengagement side frictional engagement element maintains a torque capacity corresponding to the input torque.

The time for the waiting control is reduced when the input torque is increased.

A dead time or delay from the sensing of a decrease in the hydraulic pressure applied to the hydraulic servo for the disengagement side frictional engagement element to less than a predetermined pressure until control of the down shift is changed from disengagement side control to engagement side control is based on the input torque so that the delay is increased when the input torque increases.

The dead time is changed based on an oil temperature.

The predetermined pressure for the disengagement side frictional engagement element is a load value of a return spring in the hydraulic servo for the disengagement side frictional engagement element.

The predetermined time from the shift control start is a target shift time which is set in advance based on the vehicle driving state.

The down shift is performed by disengaging the disengagement side frictional engagement element and engaging the engagement side frictional engagement element. The hydraulic pressure applied to the hydraulic servo for the disengagement side frictional engagement element and the hydraulic pressure applied to the hydraulic servo for the engagement side frictional engagement element are controlled by the respective hydraulic controllers.

The down shift to the predetermined gear ratio is performed by disengaging the disengagement side frictional engagement element, and operating an one-way clutch and/or engaging the engagement side frictional engagement element which is arranged in parallel with the one-way clutch.

The hydraulic pressure applied to the hydraulic servo for the disengagement side frictional engagement element and the hydraulic pressure applied to the hydraulic servo for the engagement side frictional engagement element are controlled by the same hydraulic controller. The change determiner switches communication of the hydraulic pressure produced by the hydraulic controller from the hydraulic servo for the disengagement side frictional engagement element to the hydraulic servo for the engagement side frictional engagement element.

A recording medium is used for a hydraulic control system for an automatic transmission comprising an input shaft which receives power from an engine output shaft, an output shaft which is connected to vehicle wheels, a plurality of frictional engagement elements that change a power transmission ratio between the input shaft and the output shaft, hydraulic servos that engage and disengage the frictional engagement elements. The recording medium is readable by a computer which is input signals from sensors detecting vehicle driving states and outputs hydraulic control signals to a hydraulic controller which controls hydraulic pressures applied to hydraulic servos. The recording medium contains recorded programs for performing a disengagement side control which controls the hydraulic pressure applied to a hydraulic servo for a frictional engagement element which is disengaged in a down shift to a predetermined gear ratio, a engagement side control which controls the hydraulic pressure applied to a hydraulic servo for a frictional engagement element which is engaged in the down shift to the predetermined gear ratio, a shift progress detecting procedure which detects a progress circumstance of the down shift based on the inputs from the sensors, and a change determining procedure which changes control of the down shift from primary control by the disengaging side control to primary control by the engagement side control when it is determined that the progress of the down shift performed by the disengagement side control has not achieved predetermined process circumstances based on the shift progress detection.

According to the invention, the down shift is controlled with the common control logic irrespective of the vehicle driving states such as the power-on state and the power-off state. Therefore, the structure can be simplified, for example, a memory capacity of the control unit is reduced.

In the case the amount of change during the down shift has not achieved the basic value when the disengagement side pressure is reduced to less than the predetermined pressure, the shift control is changed from primary control of the disengaging pressure to primary control of the engagement side pressure. Therefore, when the vehicle driving state is changed to the power-off state during a power-on down shift, the shift control is changed quickly for processing the down shift absolutely and correctly.

In the case the amount of change monitored during the down shift has not achieved the basic value when the predetermined time has elapsed, the shift control is changed from primary control of disengagement side pressure to primary control of engagement side pressure. Therefore, an excessively long shift time is prevented, and the down shift is processed absolutely even when it is unclear that the input torque is positive or negative.

In the power-off state, the shift control is performed so that the engagement side pressure is controlled mainly in, for example, an early phase control in which the disengagement side pressure is controlled based on the input torque. Therefore, the down shift is performed quickly and absolutely.

The shift progress circumstance is detected based on the amount of change of the input shaft rotation speed relative to the output shaft rotation speed (gear ratio). Therefore, the down shift progress circumstance indicated by the speed sensors achieves the predetermined progress circumstance when the gear ratio change corresponding to the end phase control is achieved, and the shift is performed correctly and absolutely.

The disengagement side pressure is decreased to lower than the predetermined pressure quickly and absolutely by the feedback control even when the vehicle driving state is changed to the power-off state during the power-on state. Therefore, a long shift time is prevented, and the feel of the down shift is improved.

The engagement side controller performs the engagement control and the end phase control, and the basic value corresponds to the start of the end phase control. Therefore, the change from the disengagement side control to the engagement side control is performed smoothly, and unneeded change after the end phase control start is deleted. Further, the hydraulic control by the engagement side controller based on changing to the engagement side is performed smoothly.

When the shift control is changed to the primary control by engagement side control, the down shift is processed correctly and absolutely by the feedback control in which the engagement side pressure is primarily controlled.

The time for the waiting control is changed based on the input torque. Therefore, the time for the waiting control is shortened and the down shift is performed quickly when the input torque is high in, for example, the power-on state. Further, in the power-off state and the negative (or low) torque state, the down shift is performed correctly because, for example, the waiting control is continued during the servo starting control performed by the engagement controller.

The dead time from when the disengagement side pressure is less than the predetermined pressure to when the change determination is performed is changed based on input torque. When the input torque is negative (or low), the dead time is shortened and the change is performed quickly. When the input torque is high, the predetermined dead time is set for absorbing the delay of the control unit such as a delay of response of the linear solenoid valves.

The dead time is also based on the oil temperature. Therefore, the down shift is performed smoothly without a tie-up at a low temperature due to a change of response speed based on the oil temperature.

The predetermined pressure at which shift control is changed to engagement side pressure control is the spring return pressure so that the shift control is changed when the disengagement side pressure in the hydraulic servo releases the engagement of the friction element. Therefore, any tie-up between the disengagement side frictional engagement element and the engagement side frictional engagement element is absolutely prevented.

The predetermined time is the target shift time set in advance based on the vehicle driving state. Therefore, the predetermined time is set correctly based on the gear ratio, and the down shift is performed correctly irrespective of the vehicle driving state.

In the clutch to clutch shift between the disengagement side frictional engagement element and the engagement side frictional engagement element, the hydraulic pressures for each frictional engagement element are controlled by their respective hydraulic controllers. Therefore, the down shift being performed by the corresponding controller is performed correctly and absolutely.

In the down shift using the one-way clutch, the engagement side frictional engagement element arranged in parallel with the one-way clutch is controlled with a correct timing. In the manual down shift in the power-off state, the time lag is avoided. The down shift is performed with a good shift feel in the power-on state, the power-off state, and when the state is indefinite, and further at the all vehicle speeds.

When the one-way clutch is employed, the hydraulic pressure based on one hydraulic controller is changed and the disengagement side pressure and the engagement side pressure are used. Therefore, the correct down shift is performed without any interference by another controller and without employing an additional expensive hydraulic controller such as a linear solenoid valve.

The hydraulic control in the down shift is performed by the recording medium such as a CDROM.

BRIEF DESCRIPTION OF THE DRAWINGS

The invention will be described in conjunction with the following drawings in which like features are designated with like reference characters, and wherein:

FIG. 3 is a table showing operation of each frictional element in the transmission of FIG. 2;

DETAILED DESCRIPTION OF THE INVENTION

The invention will become more apparent from detailed description of preferred embodiments with reference to the accompanying drawings.

Figure 2:
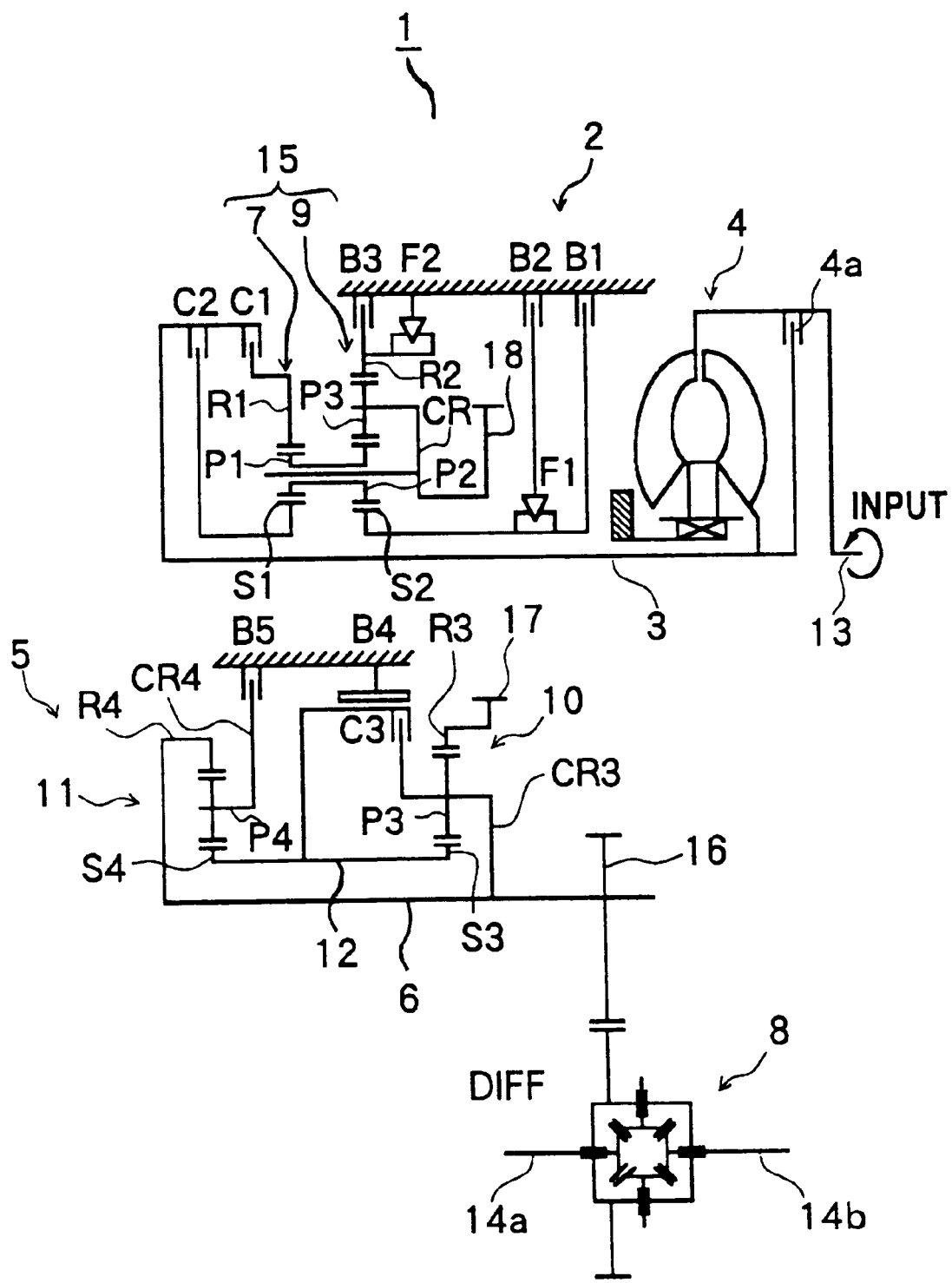
FIG. 2 is a schematic illustration illustrating structural portions of an automatic transmission controlled by the control unit of FIG. 1.

As shown in FIG. 2, a 5-speed automatic transmission 1 includes a torque converter 4, a 3-speed main transmission mechanism 2, a 3-speed auxiliary transmission mechanism 5, and a differential unit 8. These components are connected to each other to form a single structure accommodated in a case. The torque converter 4, which is provided with a lock-up clutch 4a, receives torque from an engine crank shaft 13, supplying the torque to an input shaft 3 of the main transmission mechanism 2 through a hydraulic flow in the torque converter 4 or through the lock-up clutch 4a. The first shaft 3 (input shaft) aligned with the crank shaft, the second shaft 6 (counter shaft) arranged parallel to the first shaft 3, and the third shaft (left-right wheel drive shafts) 14a, 14b are rotatably supported in the case. A valve body is established on the outside of the case.

The main transmission mechanism 2 has a planetary gear unit 15 which includes a simple planetary gear 7 and a double-pinion planetary gear 9. The simple planetary gear 7 includes a sun gear S1, a ring gear R1, and a carrier CR for supporting a pinion P1. The pinion P1 is engaged with sun and ring gears S1 and R1. On the other hand, the double-pinion planetary gear 9 includes a sun gear S2 having a different number of gear tooth compared with the gear teeth of the sun gear S1, a ring gear R2, and the carrier CR shared with the simple planetary gear 7 for supporting the pinion P2 and a pinion P3 of the double-pinion planetary gear 9. The pinion P2 is engaged with the sun gear S2 and the pinion P3 is engaged with the ring gear R2.

The input shaft 3 which is associated with the engine crank shaft 13 through the torque converter 4 can be linked to the ring gear R1 of the simple planetary gear 7 through a first (forward) clutch C1 and to the sun gear S1 of the simple planetary gear 7 through a second (direct) clutch C2. The sun gear S2 of the double-pinion planetary gear 9 can be halted directly by a first brake B1 or halted by a second brake B2 through a first one-way clutch F1. On the other hand, the ring gear R2 of the double-pinion planetary gear 9 can be halted by a third brake B3 or a second one-way clutch F2. The common carrier CR is linked to a counter drive gear 18 which serves as an output member of the main transmission mechanism 2.

The auxiliary transmission mechanism 5 includes an output gear 16, a first simple planetary gear 10, and a second simple planetary gear 11 which are arranged sequentially in the axial direction of the counter shaft 6 serving as a second shaft toward the rear side. The counter shaft 6 is rotatably supported by the single-construction case through a bearing. The first and second simple planetary gears 10 and 11 are both of the Sympson type.

As for the first simple planetary gear 10, a ring gear R3 is connected to a counter driven gear 17 which is engaged with the counter drive gear 18. A sun gear S3 is fixed to a sleeve shaft 12 which is rotatably supported by the counter shaft 6. A pinion P3 is supported by a carrier CR3 having a flange on one of the ends thereof connected to the counter shaft 6 to form an assembly. The carrier CR3 at its other end is connected to an inner hub of a UD direct clutch C3. As for the second simple planetary gear 11, a sun gear S4 is formed on the sleeve shaft 12 and connected to the sun gear S3 of the first simple planetary gear 10. A ring gear R4 is linked to the counter shaft 6.

The UD direct clutch C3 is provided between the carrier CR3 and the sun gears S3 and S4 of the first simple planetary gear. The sun gear S3 and the sun gear S4 can be halted by a fourth brake B4 such as a band brake. A carrier CR4 supporting a pinion P4 of the second simple planetary gear 11 can be halted by a fifth brake B5.

Next, operation of the mechanisms of the 5-speed automatic transmission will be explained with reference to FIGS. 2 and 3.

At a first gear ratio in the D (drive) range, the forward clutch C1 is engaged, the fifth brake B5 and the second one-way clutch F2 is also engaged, operating so as to maintain the ring gear R2 of the double-pinion planetary gear 9 and the carrier CR4 of the second simple planetary gear 11 in the halted state. In this state, the rotation of the input shaft 3 is transmitted to the ring gear R1 of the simple planetary gear 7 through the forward clutch C1. In addition, since the ring gear R2 of the double-pinion planetary gear 9 is halted, the common carrier CR is rotated in the positive direction at a substantially reduced rotational speed while the sun gear S1 and the sun gear S2 are in a free rotating state in the reverse direction. That is to say, the main transmission mechanism 2 is in the state of a first gear ratio thereof and the rotation at the reduced rotational speed is transmitted to the ring gear R3 of the first simple planetary gear 10 in the auxiliary transmission mechanism 5 through the counter gears 18 and 17. Since the carrier CR4 of the second simple planetary gear 11 is halted by the fifth brake B5, the auxiliary transmission mechanism 5 is also in the state of a first ratio thereof. In this state, the rotation of the main transmission mechanism 2 at the reduced rotational speed is further reduced by the auxiliary transmission mechanism 5 and output from the output gear 16.

At a second gear ratio, the second brake B2 (and the first brake B1) is operated in addition to the engagement of the forward clutch C1. Furthermore, the operation is switched over from the second one-way clutch F2 to the first one-way clutch F1 and the fifth brake B5 is maintained in the engaging state. In this state, the sun gear S2 is halted by the second brake B2 and the first one-way clutch F1. As a result, the rotation of the ring gear R1 of the simple planetary gear 7 transmitted from the input shaft 3 through the forward clutch C1 causes the carrier CR to rotate in the positive direction while keeping the ring gear R2 of the double-pinion planetary gear 9 in a free rotating state in the positive direction. In addition, the rotation at the reduced rotational speed is transmitted to the auxiliary transmission mechanism 5 through the counter gears 18 and 17. That is to say, the main transmission mechanism 2 is in the state of a second ratio thereof while the auxiliary transmission mechanism 5 is in the state of the first gear ratio thereof due to the engagement of the fifth brake B5. As a result of combining the state of the second ratio of the main transmission mechanism 2 and the state of the first ratio of the auxiliary transmission mechanism 5, the second ratio is obtained in the automatic transmission 1 as a whole. At that time, the first brake B1 may be operated, but when the second ratio is achieved by a coast down shift, the first brake B1 is disengaged.

At a third gear ratio, the forward clutch C1, the second brake B2, the first one-way clutch F1 and the first brake B1 are maintained in the engaging state. In addition, the engagement of the fifth brake B5 is released while, at the same time, the fourth brake B4 is engaged. That is to say, the main transmission mechanism 2 is sustained in the state thereof as it is and the rotation at the second ratio thereof aforementioned is transmitted to the auxiliary transmission mechanism 5 through the counter gears 18 and 17. In addition, in the auxiliary transmission mechanism 5, the rotation from the ring gear R3 of the first simple planetary gear 10 is output from the carrier CR3 as a rotation at a second ratio thereof due to the fact that the sun gear S3 and the sun gear S4 are halted. As a result of combining the state of the second ratio of the main transmission mechanism 2 and the state of the second ratio of the auxiliary transmission mechanism 5, the third ratio is obtained in the automatic transmission 1 as a whole.

At a fourth gear ratio, the main transmission mechanism 2 is in the same states as the above states at the second and third ratios wherein the forward clutch C1, the second brake B2, the first one-way clutch F1 and the first brake B1 are engaged. In the auxiliary transmission mechanism 5, the fourth brake B4 is disengaged while the UD direct clutch C3 is engaged. In this state, the carrier CR3, the sun gear S3 of the first simple planetary gear 10 and the sun gear S4 are connected, putting the first and second simple planetary gears 10 and 11 in a directly-coupled state wherein the first and second simple planetary gears 10 and 11 both rotate integrally. As a result of combining the state of the second ratio of the main transmission mechanism 2 and the state of a third ratio, that is, the directly-coupled state of the auxiliary transmission mechanism 5, a rotation of the fourth ratio in the automatic transmission as a whole is output from the output gear 16.

At a gear fifth ratio, the forward clutch C1 and the direct clutch C2 are engaged and the rotation of the input shaft 3 is transmitted to the ring gear R1 and the sun gear S1 of the simple planetary gear 7. The main transmission mechanism 2 is thus in a directly-coupled state wherein the planetary gear unit rotates integrally. At that time, the first brake B1 is disengaged and the second brake B2 is kept at engagement state, but the sun gear S2 is over-run because the first one-way clutch F1 is over-run. In addition, the auxiliary transmission mechanism 5 is in a directly-coupled state with the UD direct clutch C3 engaged. As a result of combining the state of a third ratio, that is, the directly-coupled state of the main transmission mechanism 2 and the state of the third ratio, that is, the directly-coupled state of the auxiliary transmission mechanism 5, a rotation at the fifth ratio in the automatic transmission as a whole is output from the output gear 16.

Furthermore, the automatic transmission also has intermediate ratios, that is, a third low gear ratio and a fourth low gear ratio which are operated during a down shift for acceleration for example.

At the third low ratio, the forward clutch C1 and the direct clutch C2 are engaged. Actually, the second brake B2 is also engaged but is over-run by the one-way clutch F1. The main transmission mechanism 2 is in a state of the third ratio thereof with the planetary gear unit 15 thereof directly coupled. The fifth brake B5 is engaged, putting the auxiliary transmission mechanism 5 in a state of the first ratio thereof. As a result of combining the state of the third ratio of the main transmission mechanism 2 and the state of the first ratio of the auxiliary transmission mechanism 5, a ratio between the second and third ratios, that is, the third low ratio aforementioned is obtained in the automatic transmission 1 as a whole.

At the fourth low ratio, the forward clutch C1 and the direct clutch C2 are engaged, putting the main transmission mechanism 2 in a state of the third ratio thereof with the planetary gear unit 15 thereof put in a directly-connected-rotation state as is the case with the state of the third low ratio. The fourth brake B4 is engaged and the sun gear S3 of the first simple planetary gear 10 and the sun gear S4 of the second simple planetary gear 11 are halted, putting the auxiliary transmission mechanism 5 in a state of the second ratio thereof. As a result of combining the state of third ratio of the main transmission mechanism 2 and the state of the second ratio of the auxiliary transmission mechanism 5, a ratio between the third and fourth ratios, that is, the fourth low ratio aforementioned is obtained in the automatic transmission 1 as a whole.

It should be noted that a dotted-line circle shown in FIG. 3 indicates that a coast engine brake is working in the first range. That is to say, at the first ratio, the third brake B3 is operated, halting the rotation of the ring gear R2 caused by an over-run of the second one-way clutch F2. In addition, at the second, the third, and fourth ratios, the first brake B1 is operated, halting the rotation of the sun gear S1 caused by an over-run of the first one-way clutch F1.

In the R (reverse) range, the direct clutch C2 and the third brake B3 are both engaged and, at the same time, the fifth brake B5 is also engaged as well. In this state, the rotation of an input shaft 3 is transmitted to the sun gear S1 through the direct clutch C2 and the ring gear R2 of the double-pinion planetary gear 9 is halted by the third brake B3. As a result, while the ring gear R1 of the simple planetary gear 7 is put in a rotation state in the reverse direction, the carrier CR is also rotated in the reverse direction. This rotation in the reverse direction is transmitted to the auxiliary transmission mechanism 5 through the counter gears 18 and 17. The carrier CR4 of the second simple planetary gear 11 is halted also in the reverse rotational direction by the fifth brake B5, maintaining the auxiliary transmission mechanism 5 in the state of the first ratio thereof. As a result of combining the rotation of the main transmission mechanism 2 in the reverse direction and the rotation of the auxiliary transmission mechanism 5 at the first ratio, a rotation at a reduced rotational speed in the reverse direction is output from the output gear 16.

Figure 1:
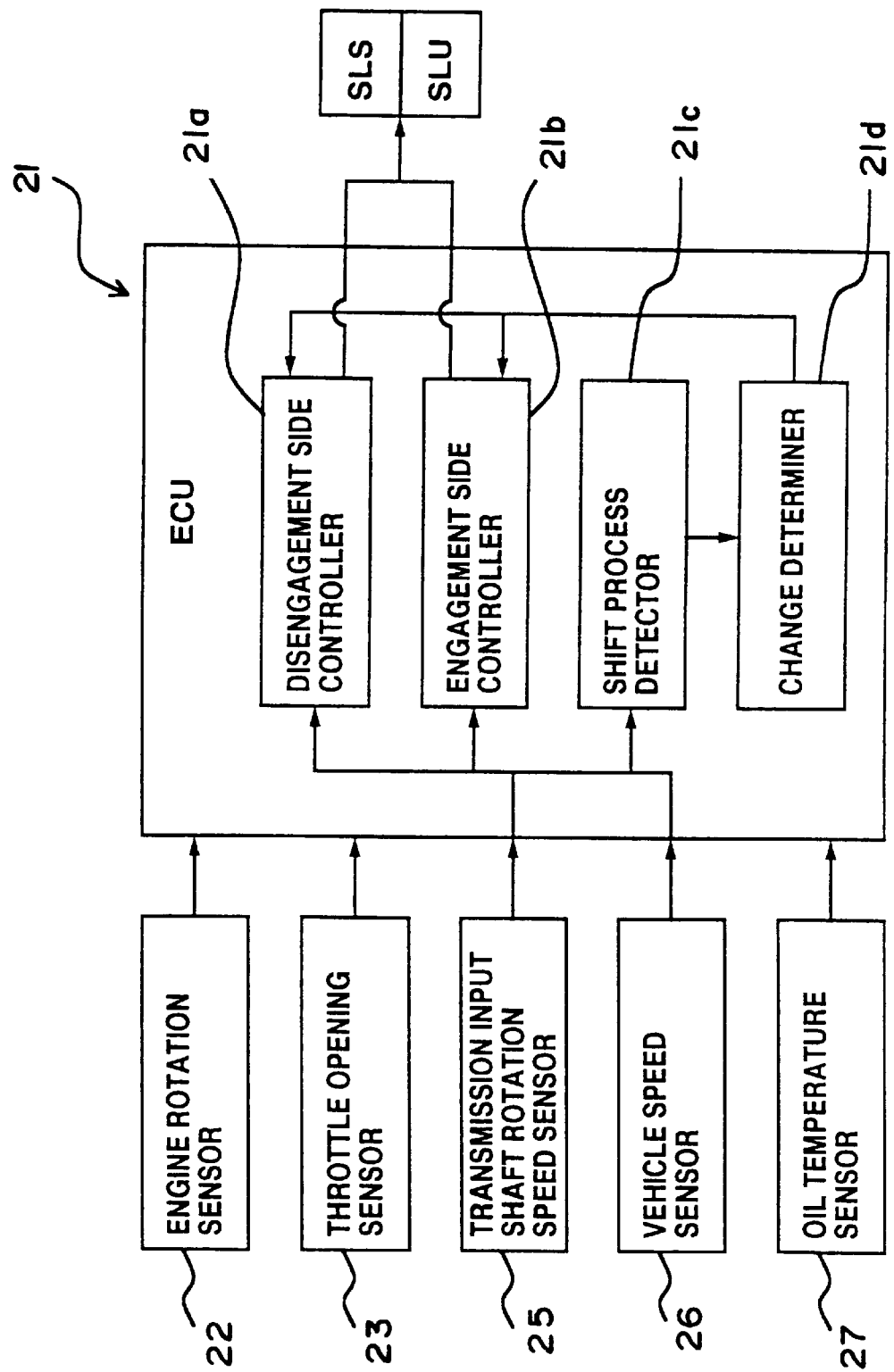
FIG. 1 is a block diagram illustrating an electronic control unit in accordance with one embodiment of the invention.

FIG. 1 is a block diagram illustrating an electric control system. A control unit (ECU) 21, such as a microcomputer, inputs signals from an engine speed sensor 22, a throttle opening sensor 23 which detects accelerator pedal pressing amount by a driver, a sensor 25 which detects an input shaft rotation speed (=turbine rotation speed) of the transmission (automatic transmission mechanism), a vehicle speed (=automatic transmission output shaft rotation speed) sensor 26, and an oil temperature sensor 27, and further outputs signals to linear solenoid valves SLS, SLU in the hydraulic circuit. The control unit 21 includes a disengagement side controller 21a which controls a disengagement side pressure, an engagement side controller 21b which controls an engagement side pressure, a shift process detector 21c which detects a rotation change amount of the input shaft rotation speed relative to the output shaft rotation speed (change in gear ratio) based on sensors such as the input shaft rotation speed sensor 25 and the vehicle speed sensor 26, and detects a process circumstance (progress) of the down shift (for example, basic value for an end phase control) based on the detected value, and a change determiner 21d which determines that the engagement side controller 21b instead of the disengagement side controller 21a should control the down shift when it is determined that the progress of the down shift by the disengagement side controller 21a has not reached a predetermined condition based on the output of shift process detector, for example, in case the disengagement pressure is equal to a return spring load pressure and the down shift progress is not in the predetermined condition or in case the input shaft rotation speed change relative to the output shaft rotation speed has not reached a basic value in a predetermined time when the shift process condition is in a predetermined process condition based on the shift process detector 21c.

Figure 4:
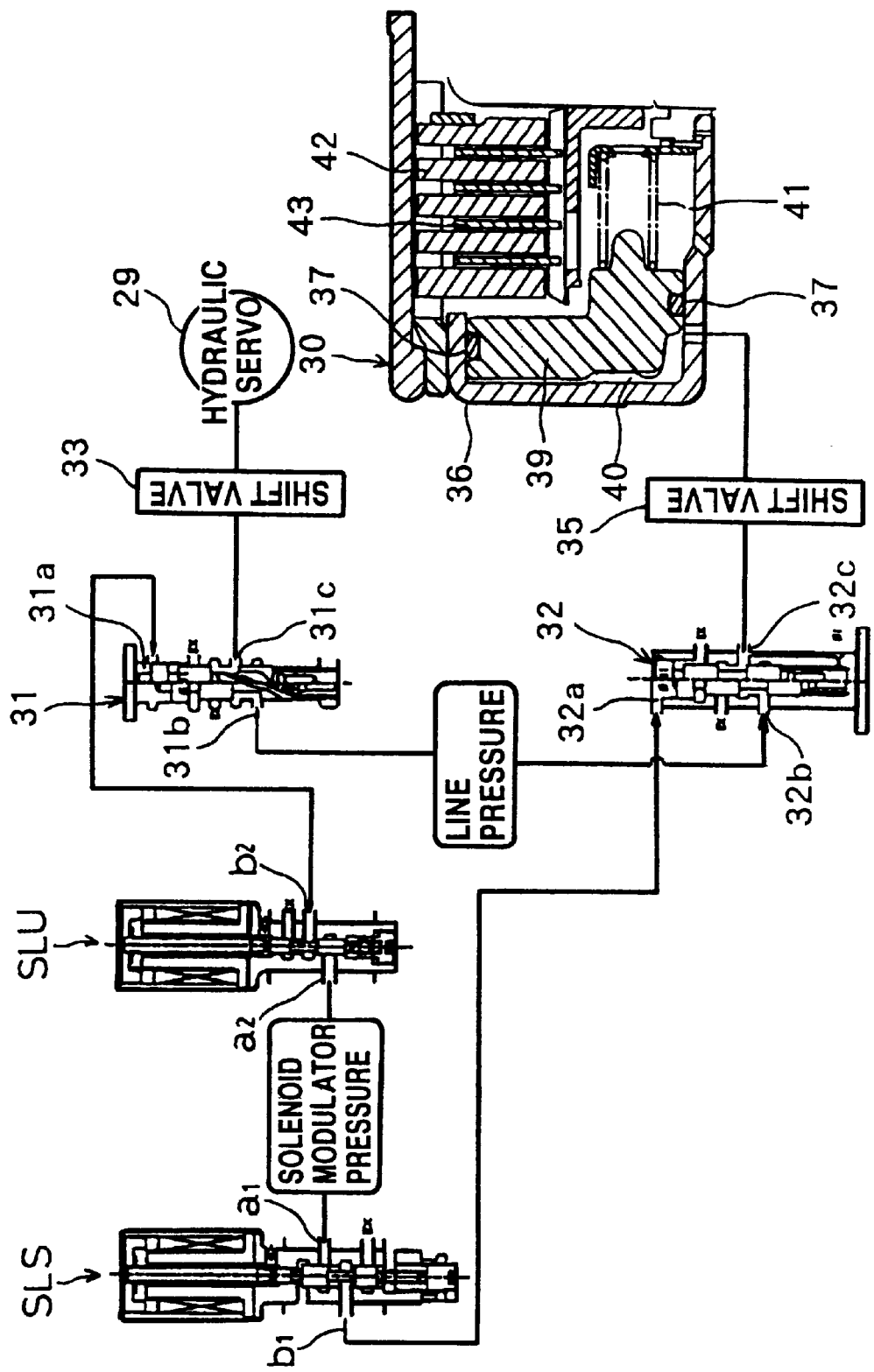
FIG. 4 is a diagram showing a hydraulic circuit for performing a shift based on chucking over of frictional engagement elements (clutch to clutch)

The hydraulic circuit of FIG. 4 includes the two linear solenoid valves SLS, SLU and a plurality of hydraulic servos 29, 30 that engage and disengage a plurality of friction engagement elements (clutches and brakes) that achieve various gear ratios, for example, five forward ratios and one rear ratio, by changing the rotational states of the planetary gear units of the automatic transmission mechanism. Input ports a1, a2 of the linear solenoid valves SLS and SLU receive a solenoid modulator pressure. The linear solenoid valves SLS, SLU apply control pressure from their output ports b1, b2 to control hydraulic chambers 31a, 32a of pressure control valves 31, 32. Input ports 31b, 32b of the pressure control valves 31, 32 receive a line pressure. The pressure regulated by the control pressure is suitably applied from the output ports 31c, 32c to the hydraulic servos 29, 30 via shift valves 33, 35, respectively.

The hydraulic circuit is merely for illustration of a basic concept about a clutch to clutch shift in which one frictional engagement element is disengaged and an another frictional engagement element is engaged. In addition to clutch operations, the term "clutch to clutch shift" includes operation of one or more brakes with or without operation of any clutch. The hydraulic servos 29, 30 and the shift valves 33, 35 are shown for illustrative purposes. Actually, the automatic transmission mechanism is provided with many hydraulic servos, specifically, a hydraulic servo for a fourth brake B4 and a hydraulic servo for a fifth brake B5 in a shift from third ratio to second ratio, and a hydraulic servo for a third clutch C3 and a hydraulic servo for a fourth brake B4 in a shift from fourth ratio to third ratio, and many shift valves for switching the hydraulic pressure to the hydraulic servos. In the hydraulic servo as shown with the hydraulic servo 30, a piston 39 is oil-tightly fitted in a cylinder 36 by an oil seal 37. The piston 39 is moved against the force from a return spring 41 by the regulated pressure applied from the control valve 32 to a hydraulic chamber 40 in order to contact outer frictional plates 42 with inner friction members 43. Although the frictional plates and members are shown in the form of a clutch, it should be understood that a brake may be constructed with one or more similar frictional plates or a drum structure and be operated in a similar manner.

Figure 5:
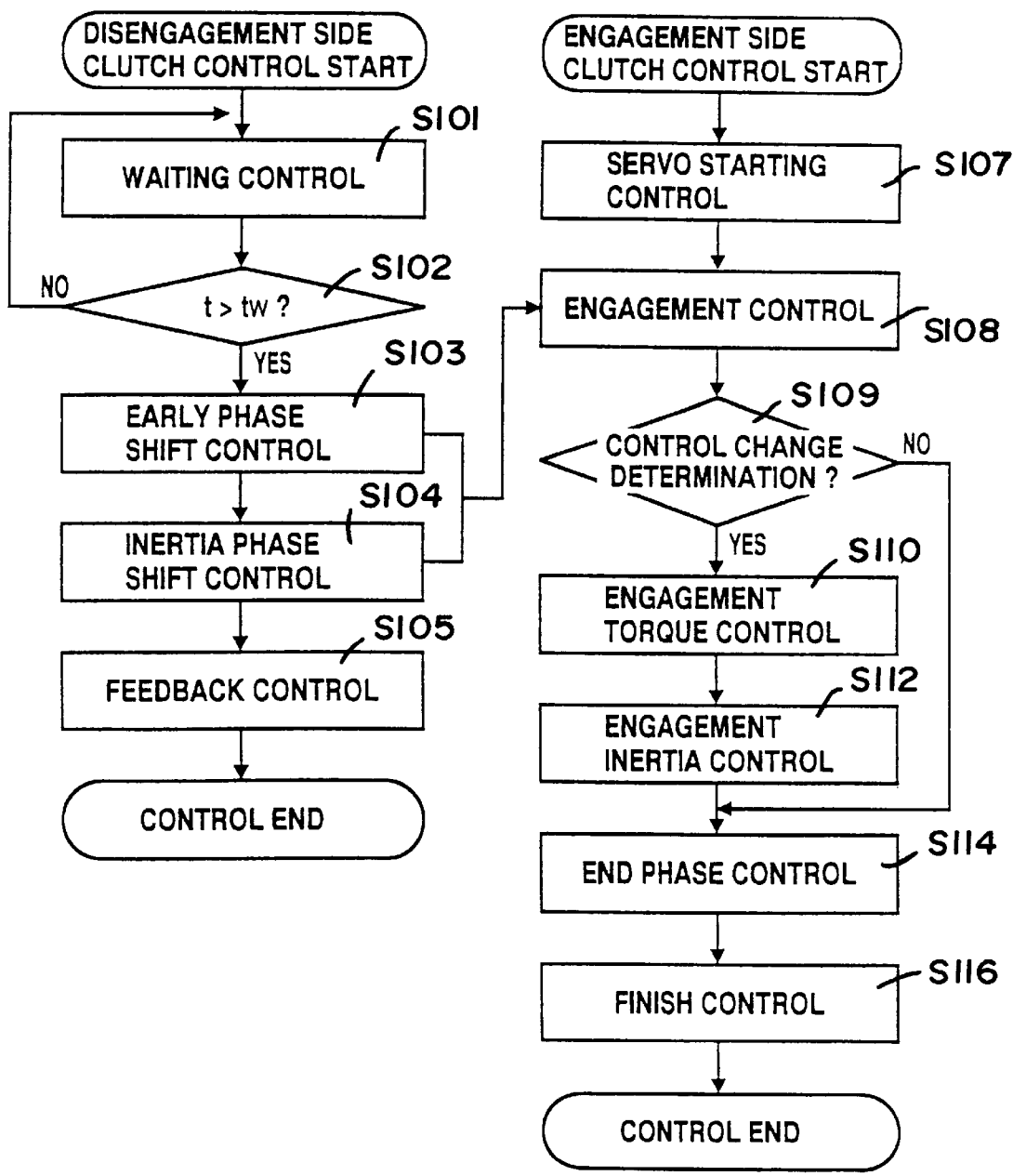
FIG. 5 is a flow chart showing a main procedure employed in the control unit of FIG. 1.

Next, a main control procedure according to the embodiment will be described with reference to the FIG. 5.

The disengagement side controller 21a performs a delay or waiting control S101, S102 at the start of a procedure for disengaging a frictional element. A time tw for the waiting control is set based on an input torque $T_t$ as described later (with reference to FIG. 12). Next, an early phase shift control S103, an inertia phase shift control S104, and a feedback control S105 are performed, then the control is ended.

The engagement side controller 21b performs a servo starting control S107 and an engagement control S108 at the start of a procedure for the engaging a frictional element. The engagement control S108 is performed based on the disengagement side pressure in the early phase shift control S103 and the inertia phase shift control S104 for the disengagement side. Then, a control change detection S109 is performed. When the answer is YES, an engagement side torque control S110 and an engagement side inertia control S112 are performed. When the answer is NO, the aforementioned controls S110 and S112 are passed and an end phase control S114 is performed. Further, a finish control S116 is performed after which the engagement control is ended.

Figure 6:
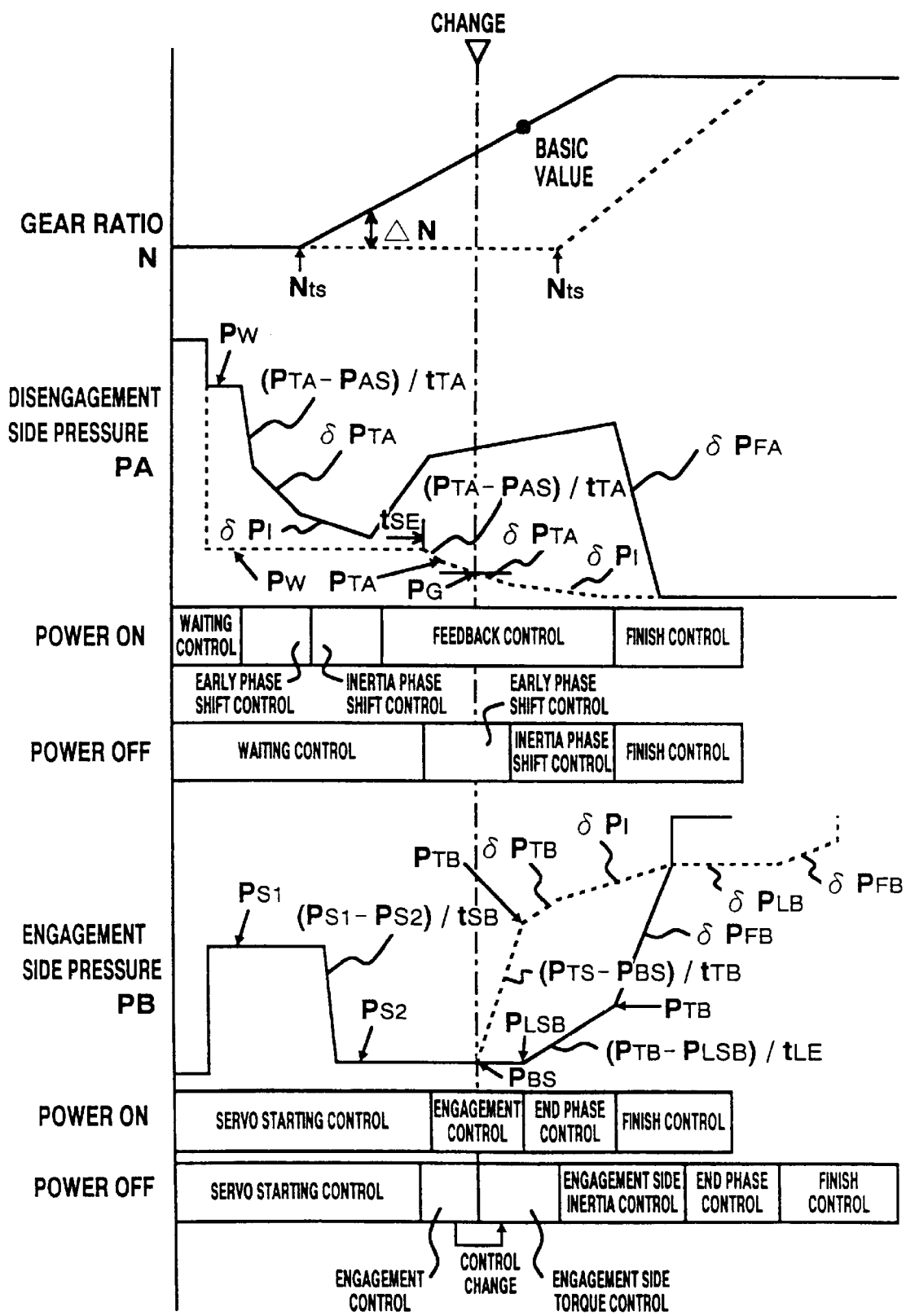
FIG. 6 is a time chart showing a down shift in a power-on state with solid lines and in a power-off state with dotted lines in the clutch to clutch shift.
Figure 7:
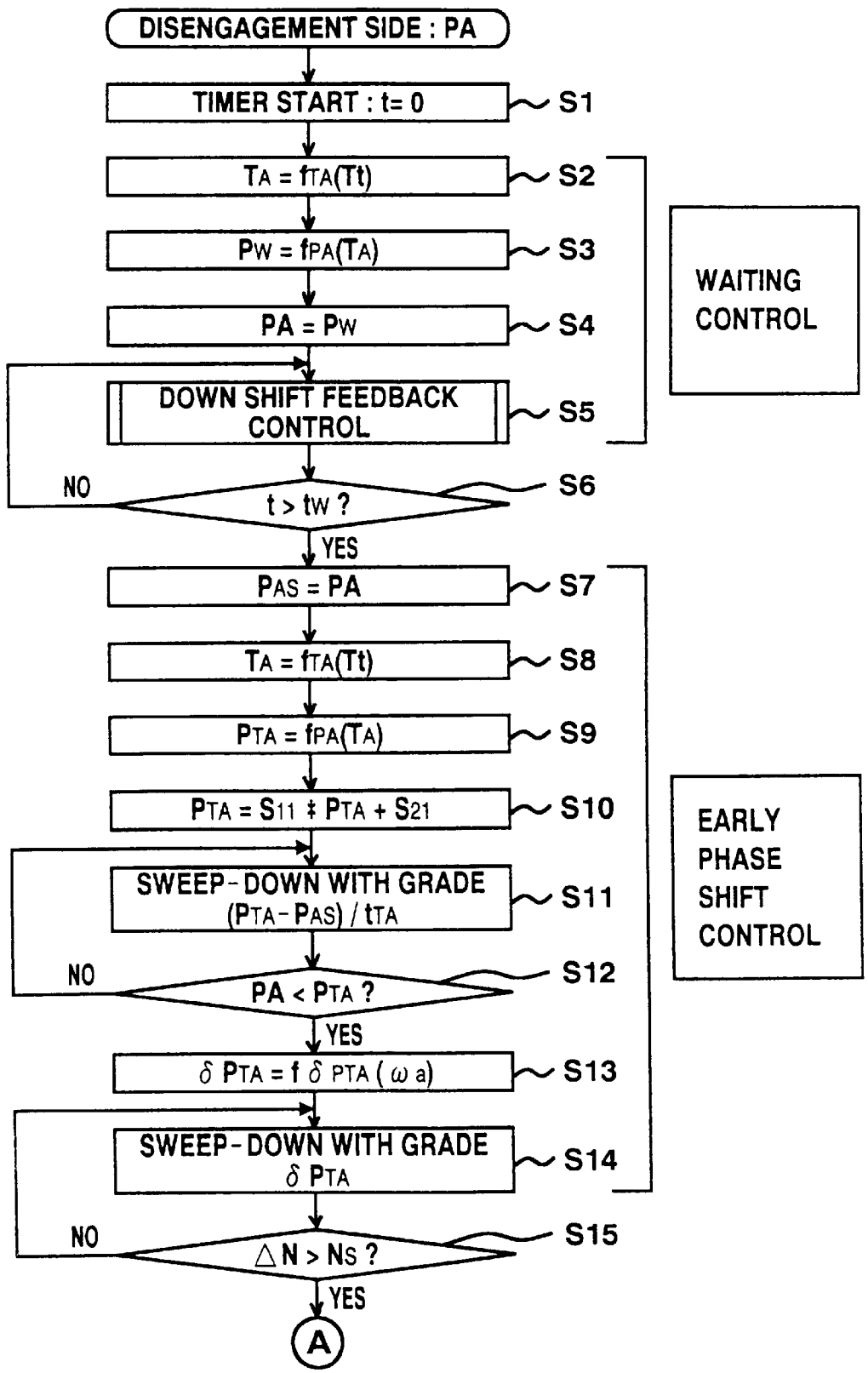
FIG. 7 is a flow chart showing a first portion of a disengagement procedure in the down shift by the clutch to clutch shift.

The down shift, for example, a shift from the third ratio to the second ratio, by the clutch to clutch shift (brake B4 disengagement and brake B5 engagement) is described with reference to FIG. 6. First a procedure for controlling the pressure PA of the disengaging frictional element (disengagement side pressure) is described with reference to FIG. 7 and FIG. 8. In FIG. 6 a solid line shows a power-on state and a dotted line shows a power-off state. That is, the solid line shows a state in which a driver feels an insufficiency of the torque and presses an accelerator pedal and the down shift is performed, and the dotted line shows a state in which the accelerator pedal is released and the down shift is performed during a reduction of the vehicle speed.

The control unit 21 determines a down shift command based on a table using signals from the throttle opening sensor 23 and the vehicle speed sensor 26. After a predetermined delay time from the shift determination, a timer is started and the shift control is started (S1). At the start time (t=0), the disengagement side pressure PA, for example, the hydraulic pressure for the hydraulic servo B4, is high at an engagement pressure, to hold the disengaging side frictional element (for example, B4 brake) engaged. In step S2, a disengagement side torque $T_A$ is calculated as a function of the input torque $T_t$ (S2). First, an engine torque is calculated from a table based upon the throttle opening and an engine rotation speed. Also, a speed ratio is calculated from input and output shaft rotation speeds of the torque converter. A torque ratio is determined from a table using the calculated speed ratio. The input torque $T_t$ is calculated by multiplying the engine torque and the torque ratio. The disengagement side torque $T_A$ is computed from the input torque using, for example, a torque allotment rate. The tables used for determining the down shift, computing the engine torque, and computing the torque ratio are known to those skilled in the art.

A waiting pressure $P_W$ for the disengagement side is calculated from the disengagement side torque $T_A$ (S3). A control signal is output to the linear solenoid valve so that the disengagement side pressure is changed to the waiting disengagement pressure $P_W$, and in this state, a down shift feedback control (S5) is performed based on, for example, the input torque.

Figure 12:
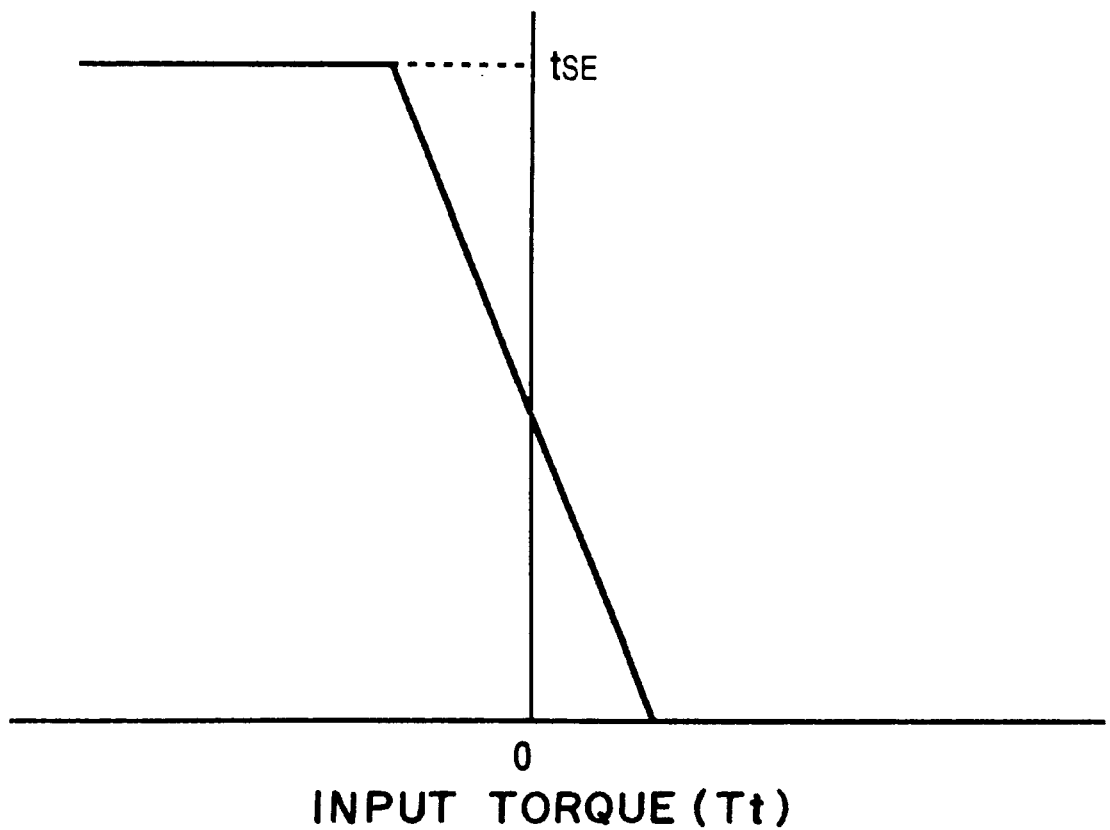
FIG. 12 is a graph showing a change of a waiting control time for the disengagement pressure.

Steps S2 through S5 perform the waiting control. The waiting control time tw is set based on the input torque $T_t$ as shown in FIG. 12 (S6). That is, in the power-off state in which the input torque $T_t$ is highly negative, the waiting control time tw is set to be a servo starting time $t_{SE}$ for engagement side as described later, and as the input torque $T_t$ increases in the positive direction such as in the power-on state, the waiting control time tw is shortened. In the waiting control, the disengagement side pressure is maintained at the waiting engagement pressure $P_W$ based on the input torque by the feedback control (S5). The waiting engagement pressure $P_W$ is relatively high in the power-on state and is relatively low in the power-off state while being maintained until the end of the servo waiting control.

Then, a predetermined disengagement side pressure $P_{AS}$ is calculated (S7) and the disengagement side torque $T_A$ is calculated as mentioned before (S2, S8). Further, a temporary target pressure $P_{TA}$ is calculated based on the disengagement side torque $T_A$ (S9). Next, a disengagement side target pressure $P_{TA}$ is calculated from the temporary target pressure based on surplus rates (tie-up rate) concerning drive feel (S10). The surplus rates are determined from throttle opening/vehicle speed tables which are known to those skilled in the art and are selected based on an oil temperature. Generally, these rates have values $S_{11}>1.0$ and $S_{21}>0.0$.

Further, a gradient (grade) or rate of decrease to the target pressure $P_{TA}$ is calculated equal to $(P_{TA}-P_{AS})/t_{TA}$ wherein $t_{TA}$ is a preset time $t_{TA}$. The disengagement side pressure PA is decreased at the calculated rate of decrease (also called "sweep-down") (S11). In the power-on state, the first portion of the sweep-down has a relatively steep gradient and is continued until the disengagement side pressure PA reaches the target pressure $P_{TA}$. In the power-off state, the sweep-down is performed with a relatively gentle gradient from a low waiting pressure. Next, a disengagement side pressure change $\delta P_{TA}$ is calculated based on a function $\delta P_{TA}=f\delta_{PTA}$ (ωa) (S13). The value ωa is a target rotation change rate which is a rate of change of the input shaft rotation speed relative to the output shaft rotation speed (gear ratio N). Then, a second portion of the sweep down is performed with the gradient (grade) $\delta P_{TA}$ (S14). When the vehicle driving state is in the power-on state, the sweep-down at the rate $\delta P_{TA}$ is continued from the initial input shaft rotation speed (gear ratio) $N_{ts}$ to a shift start indicating relative input shaft rotation speed which is indicated when a rotation change amount $\Delta N$ greater than a predetermined value $N_S$ is detected (S15). In the power-off state, the relative input rotation (gear ratio) does not change as a result of the sweep-down of the disengagement side pressure PA which continues to decrease at a relatively low rate to less than a load pressure $P_G$ of a return spring 21 of the hydraulic servo until the procedure of the engagement side of the downshift brings about a $\Delta N$ greater than $N_S$. The gradient of the second sweep-down $\delta P_{TA}$ is gentler than the gradient of the first sweep-down $(P_{TA}-P_{SA})/t_{TA}$. Steps S7 through S14 perform the early phase shift control.

Next, the disengagement side pressure PA continues its sweep-down with a grade of a predetermined pressure change $\delta P_I$ which is set in advance and is a relatively low gradient (grade) (S16). When the vehicle driving state is in the power-on state, and when the disengagement side pressure PA is greater than the load pressure $P_G$ of the return spring 21, that is, the torque capacity of the disengagement side hydraulic servo is not 0 (S17), the sweep-down at the rate $\delta P_I$ is performed until the relative rotational speed change (gear ratio change) $\Delta N$ exceeds aF (percent %) of a complete rotation speed change amount $(N_{TS}/g_i)$ $(g_{i+1}-g_i)$ from the shift start to the shift end (S18). When the vehicle driving state is in the power-off state, and when the disengagement side pressure PA is lower than the return spring load pressure $P_G$ (S17), the sweep-down with the grade $\delta P_I$ is continued until the relative rotational speed change (gear ratio change) $\Delta N$ exceeds a2 (percent %) of a complete rotation speed change amount $(N_{TS}/g_i)$ $(g_{i+1}-g_i)$ (for example, a2=90%) which is close to a complete rotation change amount from the down shift start to the down shift end (S19). The sweep-down at the rate or grade $\delta P_I$ (S16) is the inertia phase shift control.

Then, in the power-on state, a down shift feedback control (S20) is performed based on a predetermined rate of change in the input shaft rotation speed relative to the output shaft rotation speed (gear ratio). Control of the disengagement side pressure to achieve this predetermined rate of change in the gear ratio is continued until the relative input shaft rotation speed change amount $\Delta N$ exceeds to a predetermined change amount a2 (percent %) (S21). The change amount a2% is close to a complete relative rotation change amount from the down shift start to the down shift end. The feedback control (S20) is then continued until a time $t_{SE}$ from the servo control start has elapsed (S23). After step S23 is true, the down shift feedback control (S20) continues until the engagement side pressure PB increases to a value larger than a target pressure $P_{TB}$ (S24) in accordance with a relationship with a control for the engagement side pressure PB as described later. It is noted that step 20 is performed only in the power-on state and that the feedback control may actually increase the disengagement side pressure due to increasing friction element slippage from the relatively high input torque.

When a2% of the shift is finished, a predetermined pressure rate change $\delta P_{FA}$ having a comparatively steep predetermined gradient (grade) is set and a sweep-down with this predetermined grade is performed (S25) in the finish control. When the disengagement side pressure PA decreases to 0, the disengagement side pressure control is finished (S26). In the power-off state, the disengagement side pressure PA is lower than the spring load pressure $P_G$ (S17) so that the shift control is performed mainly by the engagement side control, and the finish control is performed without the feedback control after the shift progresses to a2% in the inertia phase shift control.

Figure 9:
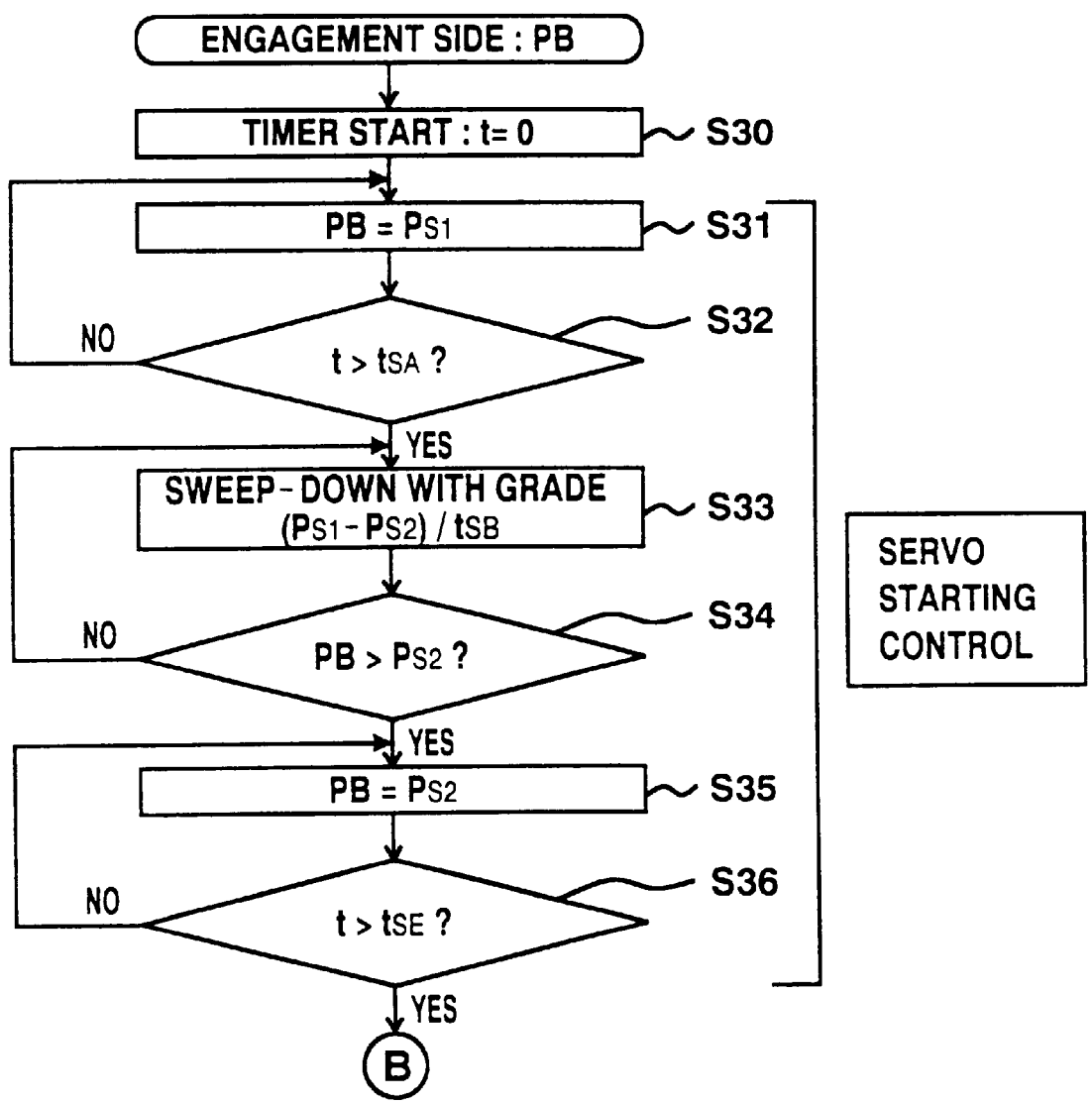
FIG. 9 is a flow chart showing a first portion of an engagement procedure in the down shift by the clutch to clutch shift.
Figure 10:
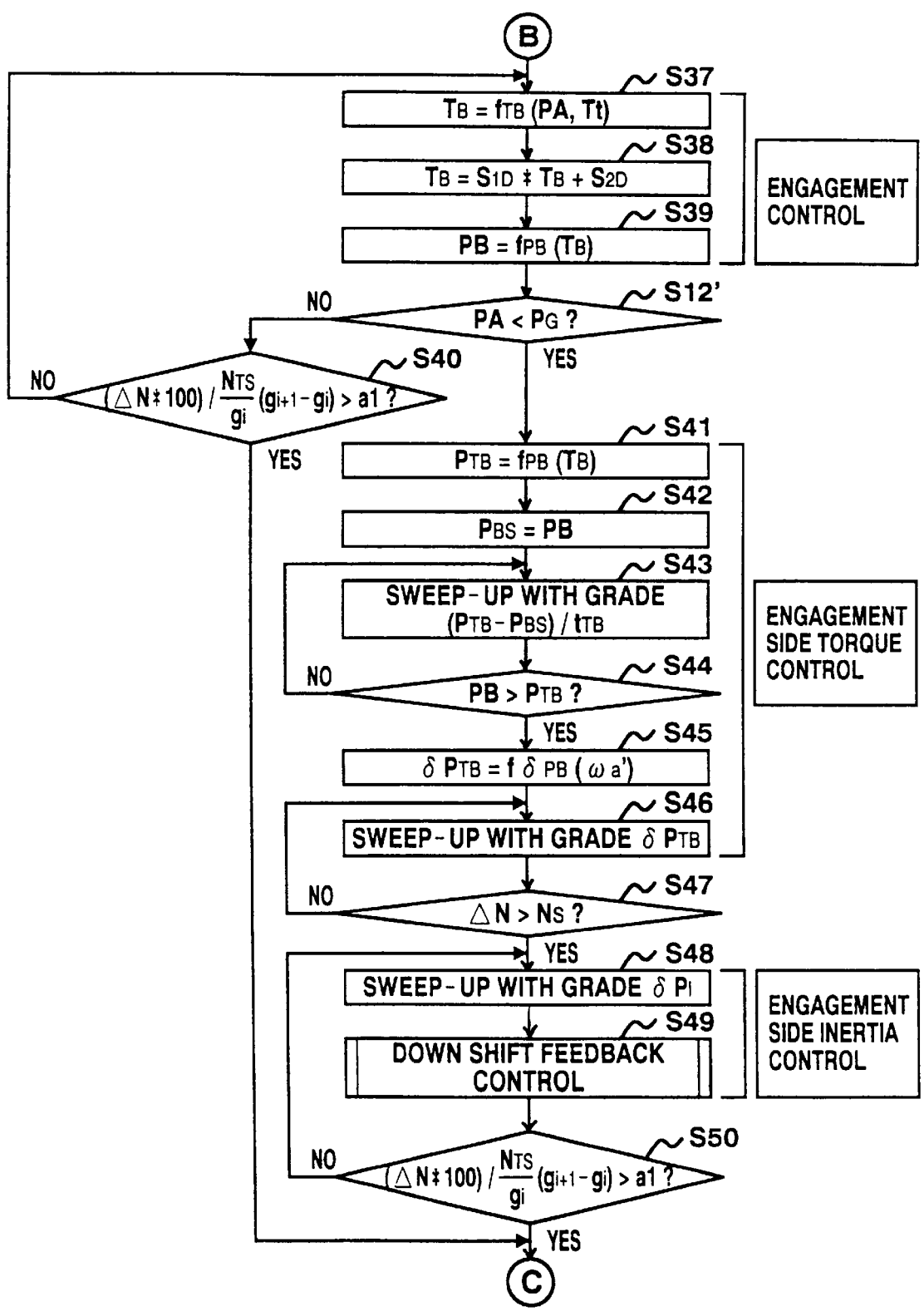
FIG. 10 is a flow chart showing a second portion of the engagement procedure continued from FIG. 9.
Figure 11:
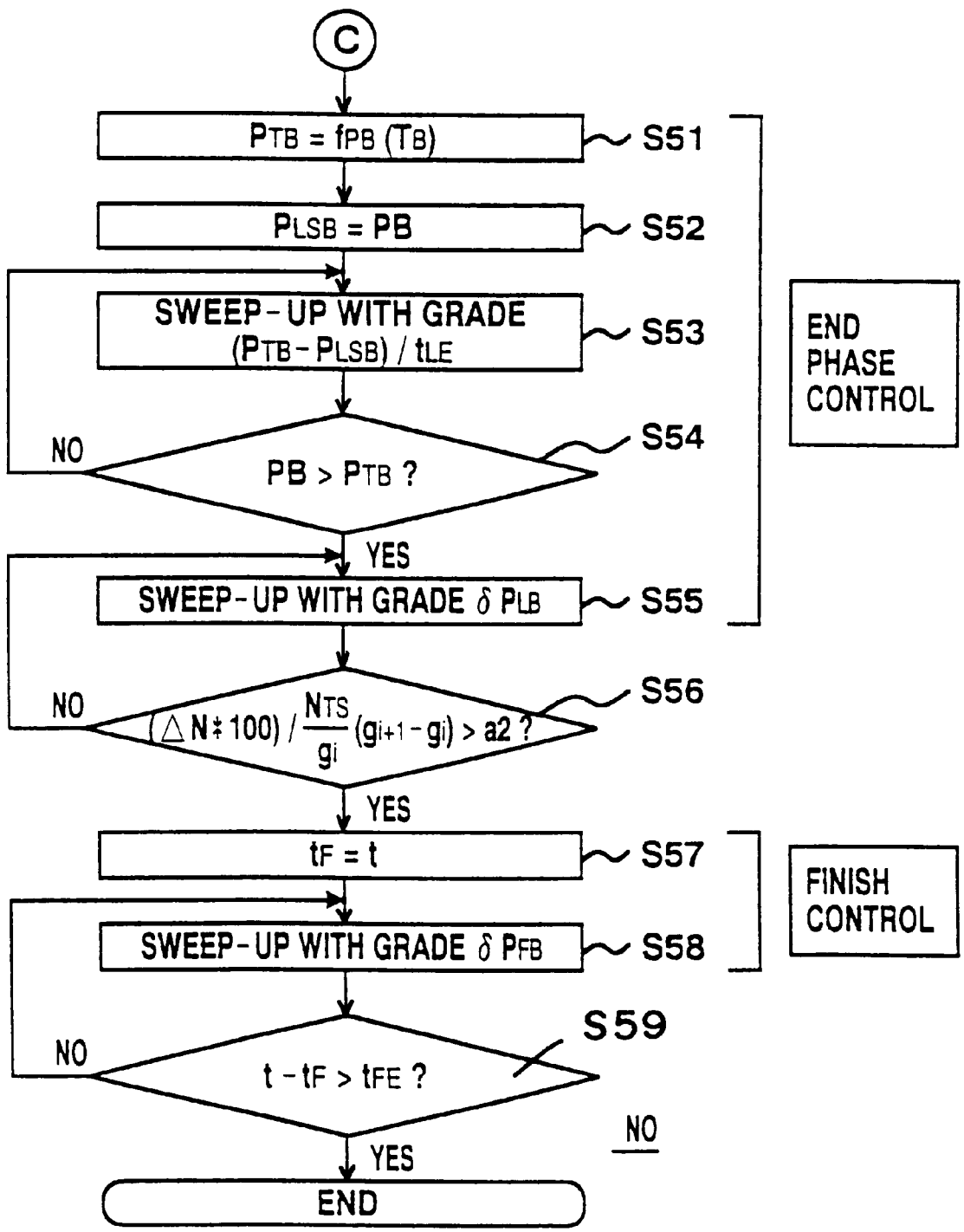
FIG. 11 is a flow chart showing a third portion of the engagement procedure continued from FIG. 10.

The control for the engagement side pressure PB is described with reference to flowcharts in FIG. 9 through FIG. 11 and the time chart in FIG. 6. As mentioned before in connection with FIG. 6, the solid line shows the power-on state, and the dotted line shows the power-off state.

A timer is started based on a downshift command from the control unit 21 (S30). A predetermined signal is output to the linear solenoid valve SLS (or SLU) to change the engagement side pressure PB to a predetermined pressure $P_{S1}$ (S31). The predetermined pressure $P_{S1}$ is a set hydraulic pressure needed for filling a hydraulic chamber 20 of the hydraulic servo. The pressure $P_{S1}$ is maintained for a predetermined time $t_{SA}$. When the predetermined time $t_{SA}$ has elapsed (S32), a sweep-down of the engagement side pressure PB is performed with a predetermined gradient (grade) $(P_{S1}-P_{S2})/t_{SB}$ (S33). When the engagement side pressure PB decreases to a predetermined low pressure $P_{S2}$ (S34), the sweep-down is stopped and the predetermined low pressure $P_{S2}$ is maintained (S35). The predetermined low pressure $P_{S2}$ is set to be larger than the return piston stroke forces but is set relatively low in order that the engagement side frictional engagement element (for example, a fifth brake B5) does not have any significant torque. The predetermined low pressure $P_{S2}$ is maintained until a timer t elapses the predetermined time $t_{SE}$ (S36). Steps S31 through S36 describe the servo starting control.

After step S36 a temporary engagement side torque $T_B$ is calculated based on a function $T_B = f_{TB}(PA, T_t)$ of the disengagement side pressure PA and the input torque $T_t$ (S37). Further, this temporary engagement side torque $T_B$ is converted into an engagement side torque is calculated in accordance with a formula $T_B = S_{1D}*T_B + S_{2D}$ wherein $S_{1D}$ and $S_{2D}$ are surplus rates (S38). Then, the engagement side pressure PB is calculated based on the engagement side torque $T_B$ PB=$f_{PB}(T_B)$] (S39). Steps S37 through to S39 describe the engagement control.

As in step S17, the disengagement side pressure PA is compared with the spring load pressure $P_G$ (S12'). When the disengagement side pressure PA is higher (NO in S12'), that is, when the vehicle driving state is in the power-on state, the engagement side pressure PB which is calculated based on the engagement side input torque $T_B$ (depending on the disengagement side pressure PA and the input torque $T_t$) is continued until a1 (percent %) of the total rotation change amount (gear ratio change) is finished (S40).

When the disengagement side pressure PA is lower than the spring load $P_G$ at step S12', that is, when the vehicle driving state is in the power-off state, the shift control is performed mainly by control of the engagement side pressure. At first, an engagement target pressure $P_{TB}$ is calculated based on the engagement side torque $T_B$ (S41). The pressure $P_{TB}$ is an engagement side pressure calculated to occur before the input shaft rotation speed relative to the output rotation speed (gear ratio) changes because of the engagement side input torque $T_B$. Further, the engagement side pressure PB, which is calculated in step S39 at the time the shift control is changed by step S12' to be controlled mainly by controlling engagement side pressure, is stored as $P_{BS}$ (S42). A predetermined gradient (grade) is calculated $(P_{TB}-P_{BS})/t_{TB}$] based on the stored pressure $P_{BS}$, the engagement target pressure $P_{TB}$ calculated at step S41 and a predetermined time period $t_{TB}$. The engagement side pressure is increased with this relatively steep grade (also called a sweep-up) (S43). The sweep-up (first sweep-up) is continued until the engagement side pressure PB exceeds the target pressure $P_{TB}$ (S44).

Then, when the engagement side pressure PB reaches the target engagement pressure $P_{TB}$, that is, when the frictional forces of the engaging frictional elements begin to change the relative rotation of the input shaft rotation speed, the pressure change rate $\delta P_{TB}$ is calculated based on a function $\delta P_{TB} = f\delta_{PB}(\omega a')$ wherein $\omega a'$ is the target rotation change rate at the rotation change start of the input shaft (gear ratio) rotation speed N (S45). Then, a second portion of the sweep-up is performed at the grade of the pressure change $\delta P_{TB}$ (S46). The second sweep-up is continued until the rotation change amount $\Delta N$ from the input shaft rotation speed $N_{TS}$ at the start of the rotation change reaches a predetermined amount $N_S$ (S47). Steps S41 through S46 describe the engagement side torque control performed in the power-off state so that the shift control is controlled mainly by control of the engagement side pressure.

After step S47 is found true, an engagement side pressure change $\delta P_I$ is set by a feedback control based on an input shaft rotation speed change amount (gear ratio change) $\Delta N$ which is based on the input shaft rotation speed sensor 5. A sweep-up is performed with the grade $\delta P_I$ (S48, S49) to perform the engagement side inertia control. The sweep-up with the grade $\delta P_I$ is continued until a1%, for example, 70% of all rotation change amount $\Delta N$ is achieved from the down shift start (rotation change start) to the end of the down shift (S50). That is, when $N_{TS}$ is made to be the input shaft rotation speed at the shift start, $\Delta N$ is made to be the rotation change amount, $g_i$ is made to be the gear ratio before the shift, and $g_{i+1}$ is made to be the gear ratio after the shift, the sweep-up is continued until $(\Delta N*100)/(N_{TS}/g_i)*(g_{i+1}-g_i)]$ exceeds a1%.

Then, after step S40 or step S50, when a1% of the complete rotation speed change amount $\Delta N$ is achieved, the end phase control is performed in steps S51 through S55. First, as in step S41, the engagement side target pressure $P_{TB}$ is calculated based on the engagement side input torque $T_B$ (S51), and the engagement side pressure PB at a1% of the rotation change amount is stored as $P_{LSB}$ (S52). A predetermined gradient (grade) $P_{TB}-P_{LSB})/t_{LE}$ is calculated based on $P_{LSB}$ and a predetermined time $t_{LE}$ which is set in advance. A sweep-up is performed with this relatively gentle grade (S53). The sweep-up is continued until the engagement side pressure achieves the target pressure $P_{TB}$. Steps S53 and S54 in the end phase control are repeatedly performed in the power-on state to change the engagement side pressure while the down shift is controlled mainly by controlling the disengagement side pressure, and are not repeatedly performed in the power-off state since the sweep-up to the engagement side target pressure $P_{TB}$ has been achieved by the engagement torque control shown in steps S41 through S46.

Then, in the power-off state, a grade $\delta P_{LB}$ which is gentler than the grade $\delta P_I$ is set (S55). The sweep-up with the grade $\delta P_{TB}$ is continued until a2%, for example, 90% of the total relative rotation speed change amount (gear ratio change) from the beginning to the end of the down shift is finished (S56). In the power-on state, step S55 is not repeated to produce any significant engagement side pressure change because the control by the disengagement side pressure control procedure has already achieved a true condition for step S56.

Further, an end time $t_F$ for the end phase control is set (S57), a relatively steep pressure gradient (grade) $\delta P_{FB}$ is set, and a sweep-up is performed with this grade (S58). The sweep-up at grade $\delta P_{FB}$ is continued for a finish control time $t_{FE}$ (S59). In the power-on state, the grade $\delta P_{FB}$ for the sweep-up is set to be steep according to the disengagement side pressure $\delta$PFA in step S25. In the power-off state, the sweep-up is performed gently till the end of the down shift. Steps S57 through S58 describe the finish control.

Figure 24:
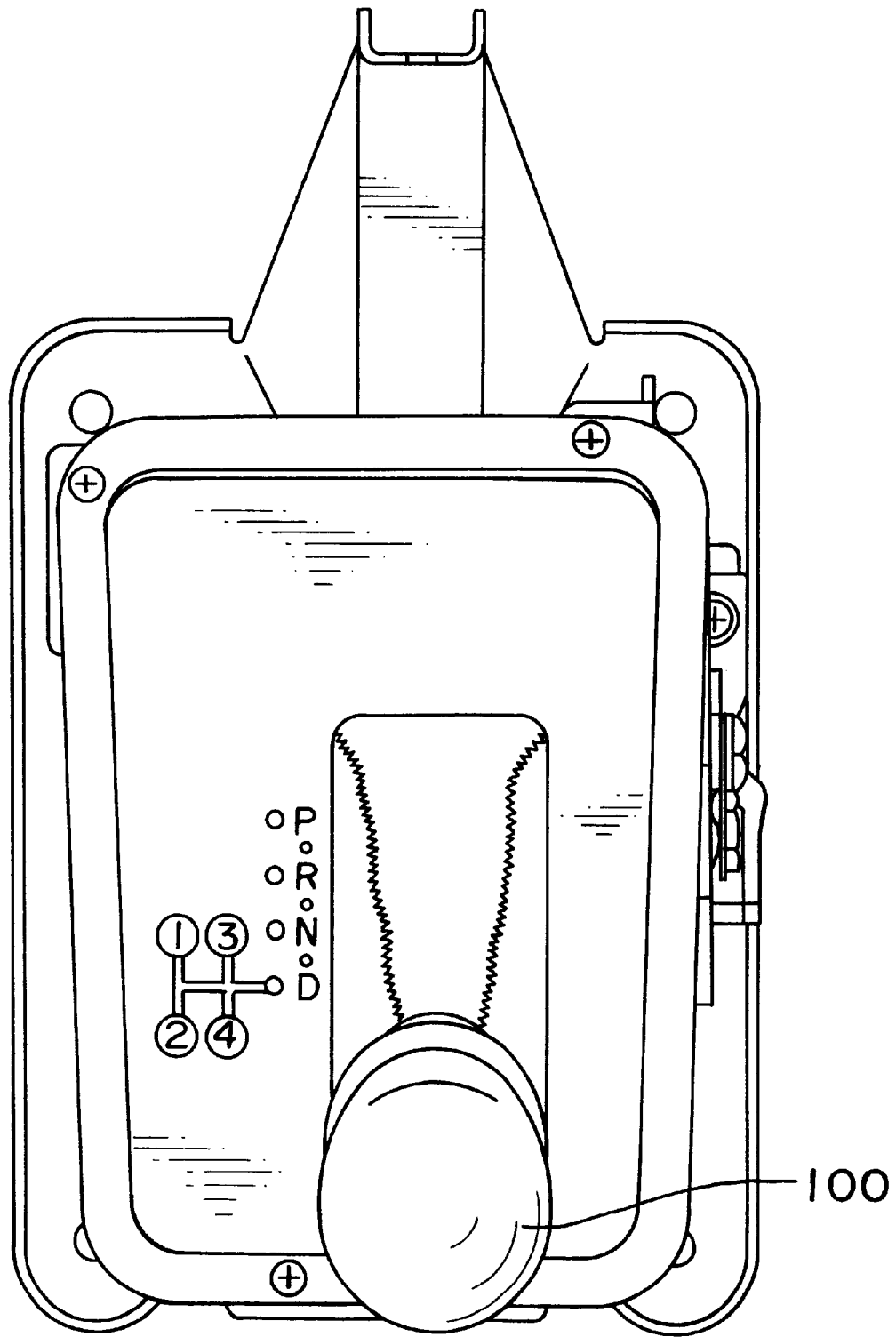
FIG. 24 is a plan view illustrating a shift lever portion of an automatic transmission that can be operated manually.

Next, a case where the vehicle driving state is changed to the power-off state during a down shift in the power-on state is described with reference to FIG. 13. This case occurs when, for example, a driver in passing another vehicle or otherwise wishing to rapidly accelerate manually operates a shift lever 100 shown in FIG. 24 or depresses the accelerator pedal to perform a down shift such as from third gear to second gear, and the driver stops the passing or acceleration by releasing the accelerator pedal during the down shift.

This down shift begins in the power-on state. Therefore, the down shift is initially controlled under the conditions as illustrated by the solid line in FIG. 6. That is, in control of the disengagement side pressure PA, a waiting engagement pressure $P_W$ is maintained for a comparatively short waiting time (waiting control), then, the sweep-downs are performed with the predetermined grades $(P_{TA}-P_{AS})/t_{TA}$, $\delta P_{TA}$, and $\delta P_I$ (early phase control, inertia control). The disengagement side pressure PA is then further controlled by the feedback control in order that an increase in the relative input shaft rotation speed (gear ratio change) $\Delta N$ equal to a predetermined change amount $N_S$ is achieved. In control of the engagement side pressure PB, the piston of the engagement side hydraulic servo is moved with the predetermined high pressure $P_{S1}$ and maintained in a servo starting engagement position by the predetermined low pressure $P_{S2}$ to initiate performance of the engagement control.

When the vehicle driving state changes from the power-on state to the power-off state during the feedback control for the disengagement side pressure PA, the disengagement side pressure PA is reduced steeply (shown with dotted line) by the reduction of the input torque caused by the change to the power-off state. The reduction of the input torque results in cessation of the change in the relative input shaft rotation speed amount (gear ratio change) $\Delta N$. Since the disengagement side pressure PA is controlled during feedback control based on maintaining a predetermined rate of change in the relative input shaft rotation $\Delta N$, the cessation of the change in the relative input shaft rotation results in the rapid decrease of the disengagement side pressure in an attempt to maintain the predetermined rate of change. Then, when the disengagement side pressure PA shown by the dotted line is reduced lower than the spring load pressure PG of the hydraulic servo, the shift control changes so that down shift is controlled mainly by control of the engagement side pressure.

In this state, the engagement side pressure PB is controlled to change the engagement side torque to produce the change of the relative input rotational speed (gear ratio) to produce the down shift. As shown with the dotted line for the engagement side pressure PB, the sweep-up (first sweep-up) is performed to the engagement target pressure based on the input torque with the grade $P_{TB}-P_{BS}/t_{TB}$, and the (second) sweep-up is performed with the grade $\delta P_{TB}$ based on the rotation change rate $\omega a$ of the input shaft rotation speed (gear ratio). Further, the engagement side pressure PB performs the sweep-ups with the grade $\delta P_I$ as modified by a feedback control based on the predetermined rate of change in the relative input rotation speed change amount (gear ratio) until a predetermined change in the relative input rotation change amount is achieved. Subsequently the engagement side pressure PB is changed at the grades $\delta P_{LB}$ and $\delta P_{FB}$ in the end phase control and the finish control. Thus the down shift, after the change from the power-on state to the power-off state, is processed by control of the engagement side pressure.

Next, a procedure for determining a change to the state in a case where a down shift is controlled mainly by controlling the engagement side pressure PB is described with reference to FIG. 14 and FIG. 15. The down shift is initially processed by control of the disengagement side pressure, basically. However when there is a lack of input torque, for example, during a power-off state, the down shift cannot be processed by control of the disengagement side pressure because the relative input rotation speed (gear ratio) is not increased by the disengagement of the disengaging frictional element. Thus the down shift control is changed so as to be controlled mainly by control of the engagement side pressure.

More specifically when the disengagement side pressure is reduced lower than the load pressure PG of the return spring 41 in the disengagement side hydraulic servo 30 (S60) to release the hydraulic pressure in the hydraulic servo 30 during a down shift performed by the feedback control of the disengagement side pressure based on a change in the input shaft rotation speed detected by the input shaft rotation speed sensor 25 relative to the output shaft rotation speed detected by the vehicle speed sensor 26 (gear ratio) N or in the case the input torque is negative (or small) in the power-off state and the down shift is processed by controlling the disengagement side pressure based on the input torque, a timer starts (S61). A dead time t1 for operation of the timer is set based on the input torque $T_t$ as shown in FIG. 15. The dead time t1 increases when the input torque is increased from a predetermined negative value to a predetermined positive value. When the input torque is larger than the predetermined torque, the dead time t1 is a predetermined set time. Then, after the dead time t1 has elapsed, the change determination to change to engagement pressure control is made (S62), and the down shift control is changed to be performed mainly by the control of the engagement side pressure.

On the other hand, when the answer is NO at step S60 or S61, that is, when the disengagement side pressure value is larger than the spring load pressure value PG or when the disengagement side pressure value becomes lower than the spring load pressure value PG before the predetermined dead time t1 has elapsed, it is determined whether an end phase decision is performed (S63). That is, it is determined whether the relative input rotation speed (gear ratio) change amount $\Delta N$ achieves a1%, for example, 70%, of the total relative rotation speed change amount from the beginning to the end of the down shift (with reference to the basic value in FIG. 6 and FIG. 13). Then, when the answer is YES at step S63, that is, when the predetermined percent of the down shift is completed, the change determination is NO in step (S64) and the down shift is processed mainly by controlling the disengagement side pressure. When the answer is NO at step S63, steps S60 and S61 are repeated. When the relative input shaft rotation speed (gear ratio) is not increased by the predetermined percent, the disengagement side pressure value will eventually be reduced to a value lower than the spring load pressure PG, and the change decision (S62) will be YES.

Another embodiment of a procedure to change control of a down shift from performance mainly by controlling the disengagement side pressure to performance mainly by controlling the engagement side pressure is described with reference to FIG. 16. A predetermined time t2 is set to be the maximum time during which the down shift is normally performed by controlling the disengagement side pressure without any trouble. The predetermined time t2 is a target shift time set in advance based on the driving state such as the gear ratio, the input shaft rotation speed, the input torque, and the vehicle speed. Then, the elapsed time t from the shift start (t=0) is compared with the predetermined time t2 (S70). When the time t is shorter than the predetermined time t2 (NO), it is decided whether the end phase is determined (S71). The end phase is determined in the predetermined time t2 when gear ratio change achieves a predetermined value, and the change decision is NO (S72) so that the shift continues to be processed mainly by controlling the disengagement side pressure.

On the other hand, when the predetermined time t2 has elapsed (YES) (S70) before the end phase is determined (any change in gear ratio has not achieved the predetermined value), the change decision is YES (S73), and the shift control is changed so that the down shift is performed mainly by controlling the engagement side pressure. Although the change in down shift control is acceptably performed in the procedure of FIG. 16 by making the change decision solely based upon elapsed time, the procedure of FIG. 14 has an advantage over the procedure of FIG. 16 in that the shift control is changed immediately when the disengagement side pressure value is reduced lower than the spring load value PG in the power-off state so that the down shift is controlled mainly by controlling the engagement side pressure to ensure that the down shift is performed correctly and absolutely. Further in the procedure of FIG. 16 when the end phase is not determined in the predetermined time t2 and where the input torque is in a marginal state, the down shift control is changed to be mainly controlled by the engagement side pressure which completes the down shift in a long shift time much greater than the optimum shift time in the power-on state.

Next, an embodiment applying a down shift, in which an one-way clutch operates, is described with reference to FIG. 17 through FIG. 23.

In the conventional hydraulic control system, in a down shift involving a one-way clutch, for example, in a shift from a fifth gear ratio to a fourth gear ratio (FIG. 3), a disengagement side frictional engagement element (for example, direct clutch C2, FIG. 2) is disengaged and the one-way clutch (for example, first one-way clutch F1) operates, then the shift to the low ratio (for example, fourth ratio) is performed. After elapse of a predetermined time after the disengagement of the disengaging element, a shift valve is operated so that a frictional engagement element (for example, first brake B1) in parallel with the one-way clutch is engaged. Then, the shift is controlled in order to achieve an engine brake.

In this conventional control, there is provided the predetermined delay after disengagement of the disengaging element (C2) before applying hydraulic pressure to the hydraulic servo for the frictional engagement element (B1) to prevent a tie-up in the down shift in the power-on state. Therefore, in a manual down shift in the power-off state, a time lag is occurs in the shift, and it is difficult to achieve a good shift feel for all vehicle speeds.

In the embodiment of FIGS. 17–23, an object is to achieve the good shift feel for all vehicle speeds including a case of the manual shift down at high vehicle speed by controlling the timing of the start for application of the hydraulic pressure to the frictional engagement element (for example, B1 brake) based on the control value of the hydraulic pressure for the disengagement side frictional engagement element (for example, C2 clutch) being decreased to value lower than the predetermined value as similar to the case of the previously described clutch to clutch shift.

Figure 17:
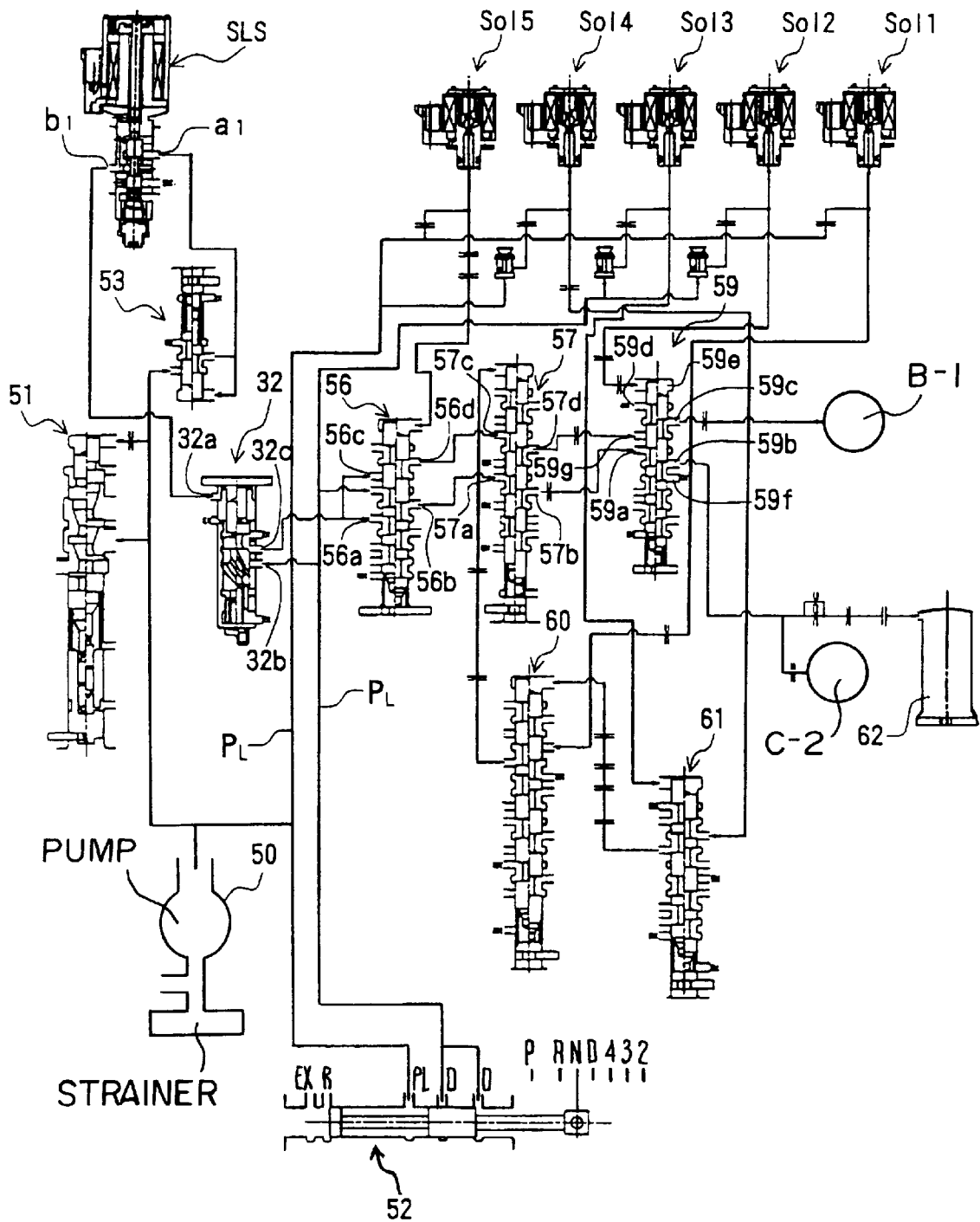
FIG. 17 is a diagram showing a hydraulic circuit for performing a down shift in an automatic transmission using an one-way clutch.

First, a hydraulic circuit for effecting the down shift employing the one-way clutch, specifically, a shift from a fifth gear ratio to a fourth gear ratio is described with reference to FIG. 17. In FIG. 17, a reference numeral 50 denotes an oil pump, a reference numeral 51 denotes a primary regulator valve, a reference numeral 52 denotes a manual valve, the notation SLS denotes the linear solenoid valve, and a reference numeral 53 denotes a solenoid modulator valve. The reference numeral 32 denotes the shift pressure control valve, a reference numeral 56 denotes a shift pressure relay valve, a reference numeral 57 denotes a M1 shift valve, a reference numeral 59 denotes a M2 shift valve, a reference numeral 60 denotes a U1 shift valve, and a reference numeral 61 denotes a U2 shift valve. Further, notations Sol1–Sol5 denote solenoid valves having ON and OFF states. The solenoid valves Sol1 and Sol4 are the normally open type, and the solenoid valves Sol2, Sol3, and Sol5 are the normally closed type. Reference numeral B-1 denotes a hydraulic servo for a first frictional engagement element which is arranged in parallel with the one-way clutch F1 and which is operated to engage the first frictional element by engagement side pressure in the shift from the fifth ratio to the fourth ratio, a notation C-2 denotes a hydraulic servo for a direct clutch which is disengaged by control of disengagement side pressure to the servo C-2 during the shift from fifth ratio to fourth ratio, and a reference numeral 62 denotes an accumulator for the fluid fed to the servo C-2.

Next, the operation of the hydraulic circuit in the shift from fifth ratio to fourth ratio is described. First, a hydraulic pressure from the oil pump 50 is regulated to a line pressure by the primary regulator valve 51, and is further regulated to a solenoid modulator pressure by the solenoid modulator valve 53. The solenoid modulator pressure is applied to an application port a1 of the linear solenoid valve SLS. This linear solenoid valve SLS produces a properly regulated control pressure at an output port b1 wherein the control pressure is based on a control signal from the electronic control unit 21. The control pressure is applied to a control chamber 32a of the shift pressure control valve 32 which regulates the line pressure PL applied to the input port 32b to produce an application pressure output from an output port 32c. This output application pressure corresponds to the control pressure.

In the fifth gear ratio, the solenoid valves Sol3, Sol4, and Sol5 are in a closed state, and the solenoid valves Sol1 and Sol2 are in an open state. In these states, the solenoid valves maintain the shift pressure relay valve 56 in the right half position, the M1 shift valve 57 in the left half position, the M2 shift valve 59 in the left half position, the U1 shift valve 60 in the left half position, and the U2 shift valve 61 in the right half position.

While the shift valves are maintained in these positions, the application pressure produced by the shift pressure control valve 32 based on the control pressure from the linear solenoid valve SLS is applied to the hydraulic servo C-2 for the direct clutch and the accumulator 62 via ports 56a, 56b of the shift pressure control valve 56, ports 57a, 57b of the M1 shift valve 57, and ports 59a, 59b of the M2 shift valve 59. The hydraulic pressure in the hydraulic servo B-1 for the first brake is drained via ports 59c, 59d of the M2 shift valve 59.

In fourth ratio, the solenoid valves Sol3, Sol4, Sol5 are maintained in the closed state, and the solenoid valve Sol2 is changed to the closed state with the solenoid valve Sol1 remaining in the open state. Then, a hydraulic pressure is applied to a control chamber 59e of the M2 shift valve 59, and the shift valve 59 is moved to a state on the right half position. In this state, the hydraulic pressure in the hydraulic servo C-2 for the direct clutch is drained via ports 59b, 59f. On the other hand, the output pressure from the port 32c of the shift pressure control valve 32 based on the control pressure from the linear solenoid valve SLS is applied to the hydraulic servo B-1 for the first brake via ports 56c, 56d of the shift pressure relay valve 56, ports 57c, 57d of the M1 shift valve 57, and ports 59g, 59c of the M2 shift valve 59.

Figure 18:
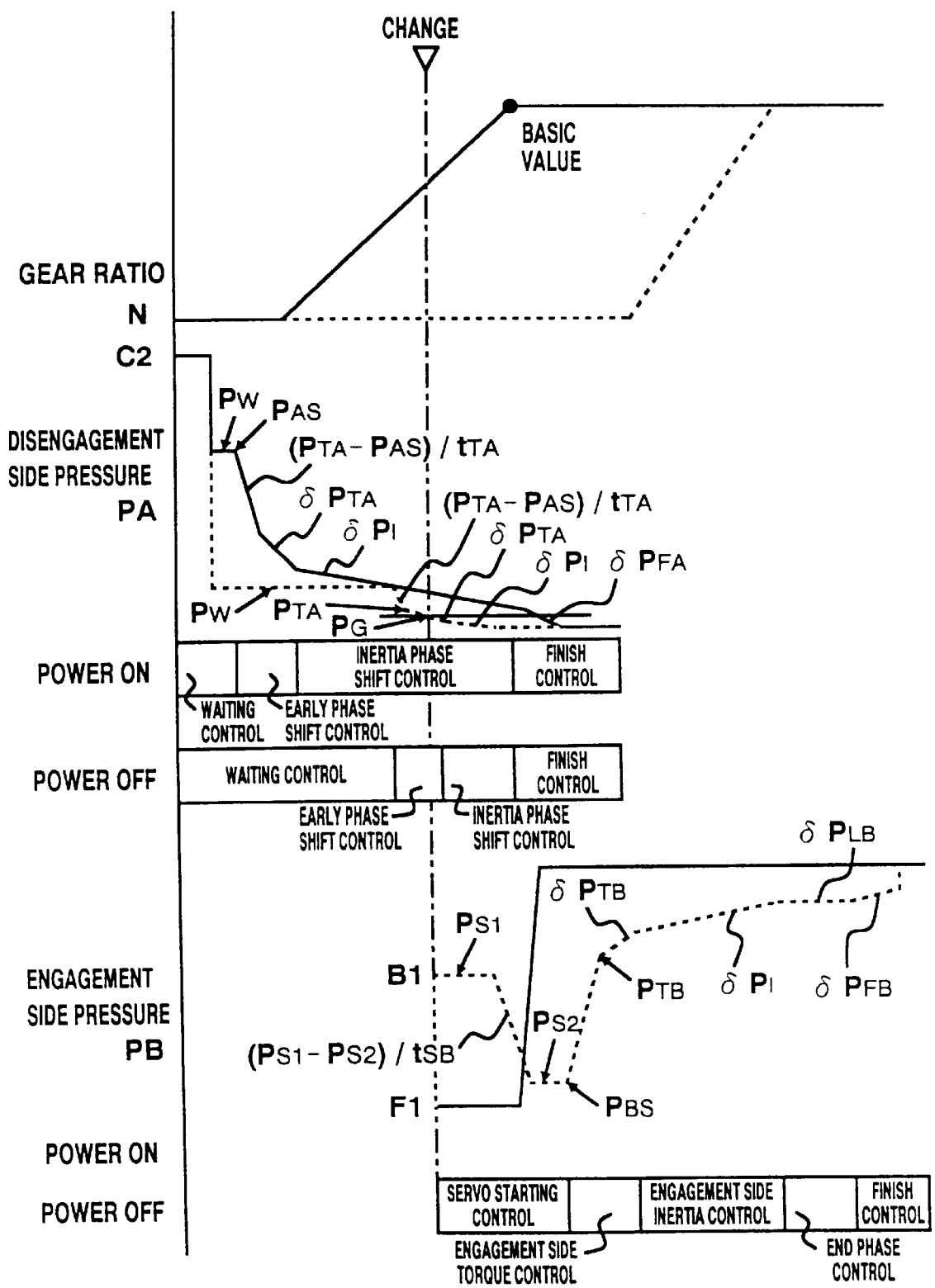
FIG. 18 is a time chart showing a down shift in a power-on state with solid lines and in a power-off state with dotted lines in the shift using the hydraulic circuit of FIG. 17.
Figure 19:
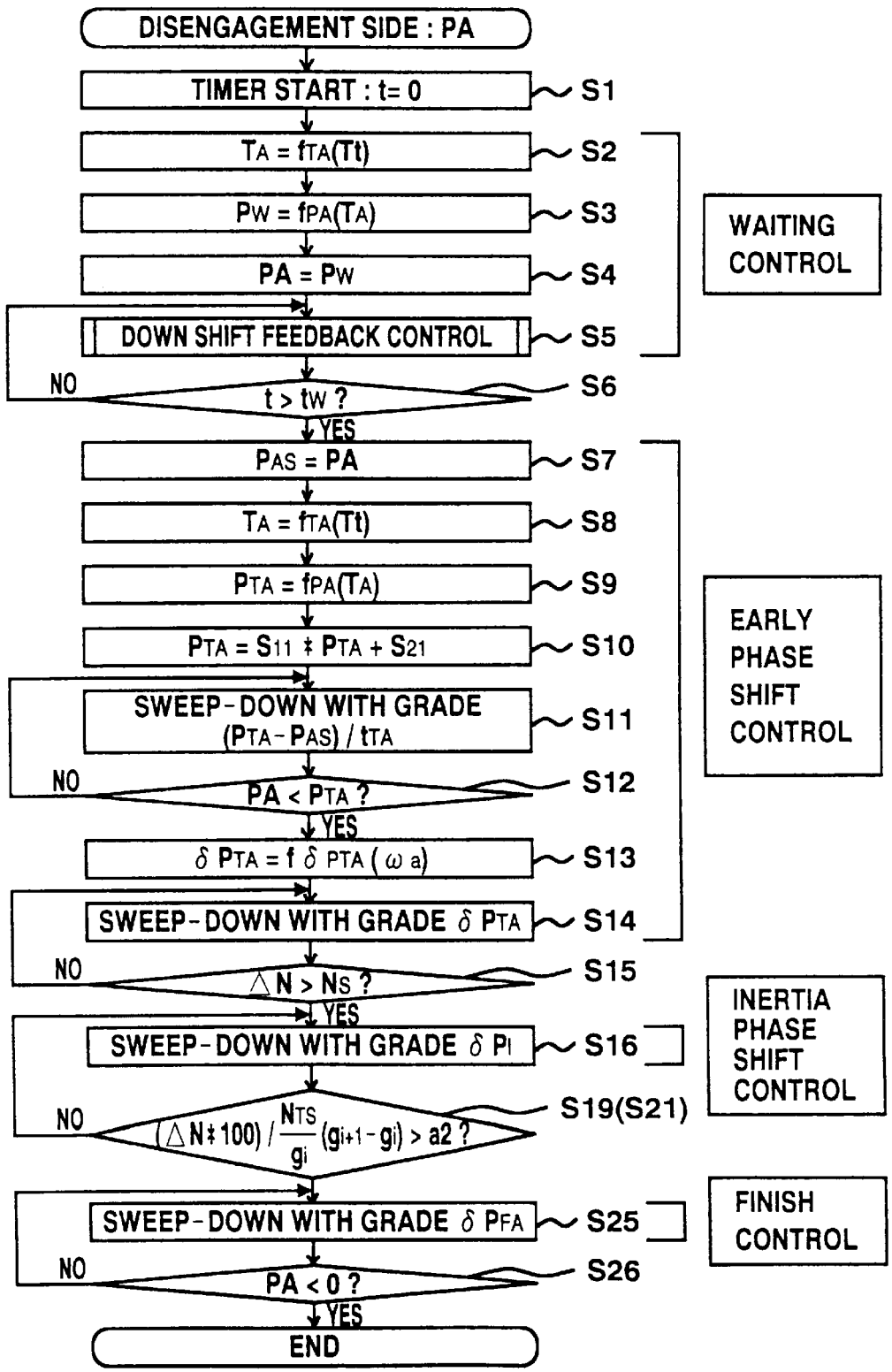
FIG. 19 is a flow chart showing a control procedure for a disengagement pressure in a down shift.

The control for the disengagement side pressure PA in the down shift operating the one-way clutch, specifically, the hydraulic pressure for the direct clutch C2 in the shift from fifth ratio to fourth ratio is described with reference to FIG. 18 and FIG. 19. The control for the disengagement side pressure is similar to the clutch to clutch control described above with reference to FIG. 6, FIG. 7, and FIG. 8. Therefore, the same step numbers are used in FIG. 19 to indicated similar operation, and a specific description is omitted for sake of brevity.

Figure 8:
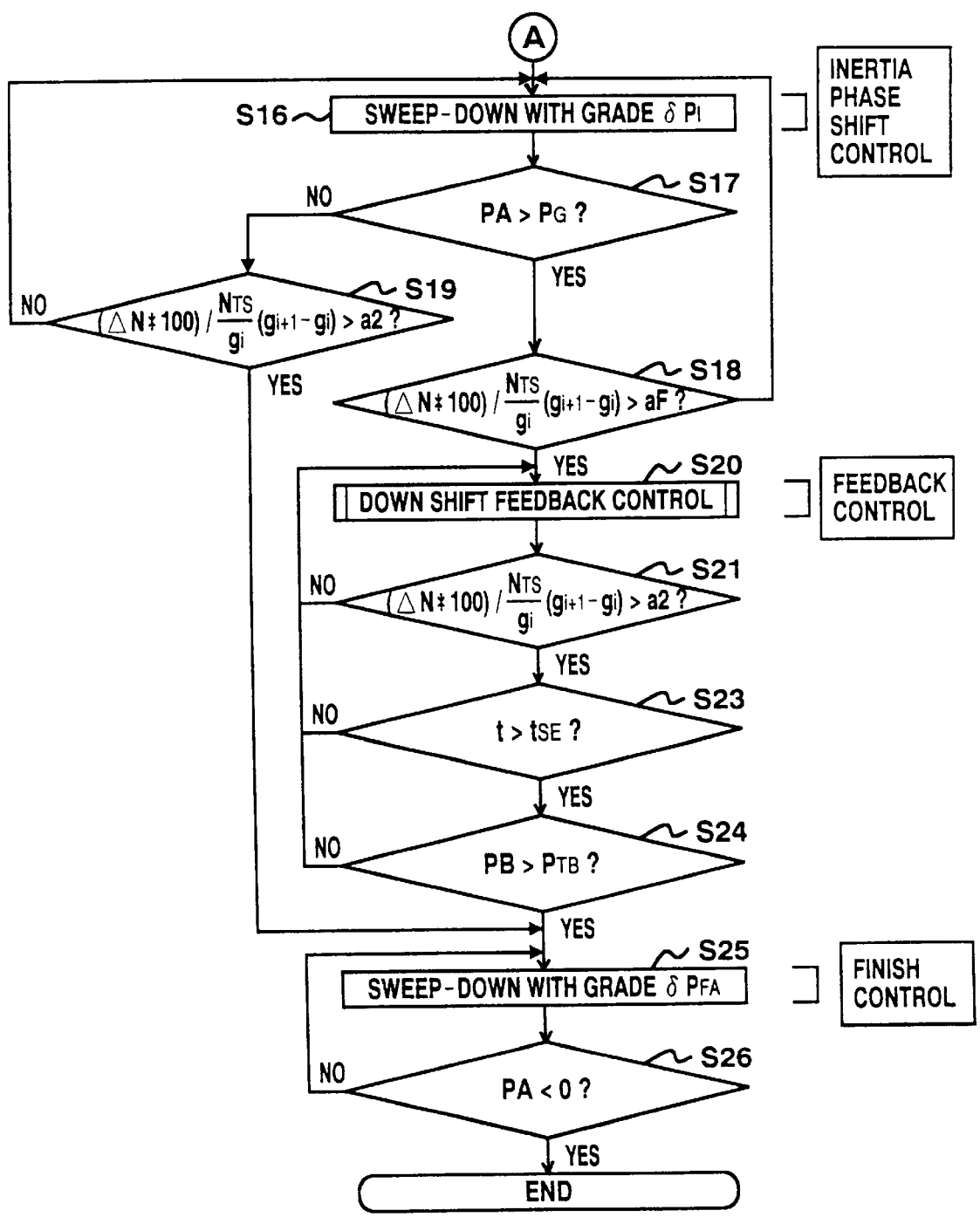
FIG. 8 is a flow chart showing a second portion of the disengagement procedure continued from FIG. 7.

In a waiting control described with steps S2 through S6, the disengagement side pressure PA and a waiting time tw are set based on the input torque $T_t$. Therefore, in the power-on state, a waiting engagement pressure $P_W$ is set high and the waiting time tw is set short as shown with a solid line in FIG. 18, and in the power-off state, the waiting engagement pressure $P_W$ is set low and the waiting time tw is set long as shown with a dotted line in FIG. 18. In the power-on state, the one-way clutch operates automatically when the relative input shaft rotation speed (gear ratio) N is increased to a relative rotation speed corresponding to the gear ratio (fourth ratio) desired after the shift. In the power-off state, the disengagement side pressure PA is lowered to a value less than the spring load PG similar to the previously described clutch to clutch shift. Therefore, in the power-off state, the disengagement side pressure PA is swept-down with the predetermined grade $\delta P_I$, and steps (S17, S20, S23, S24) in the feedback control shown in FIG. 8 are not needed in the disengagement side pressure control employing the one-way clutch.

Figure 20:
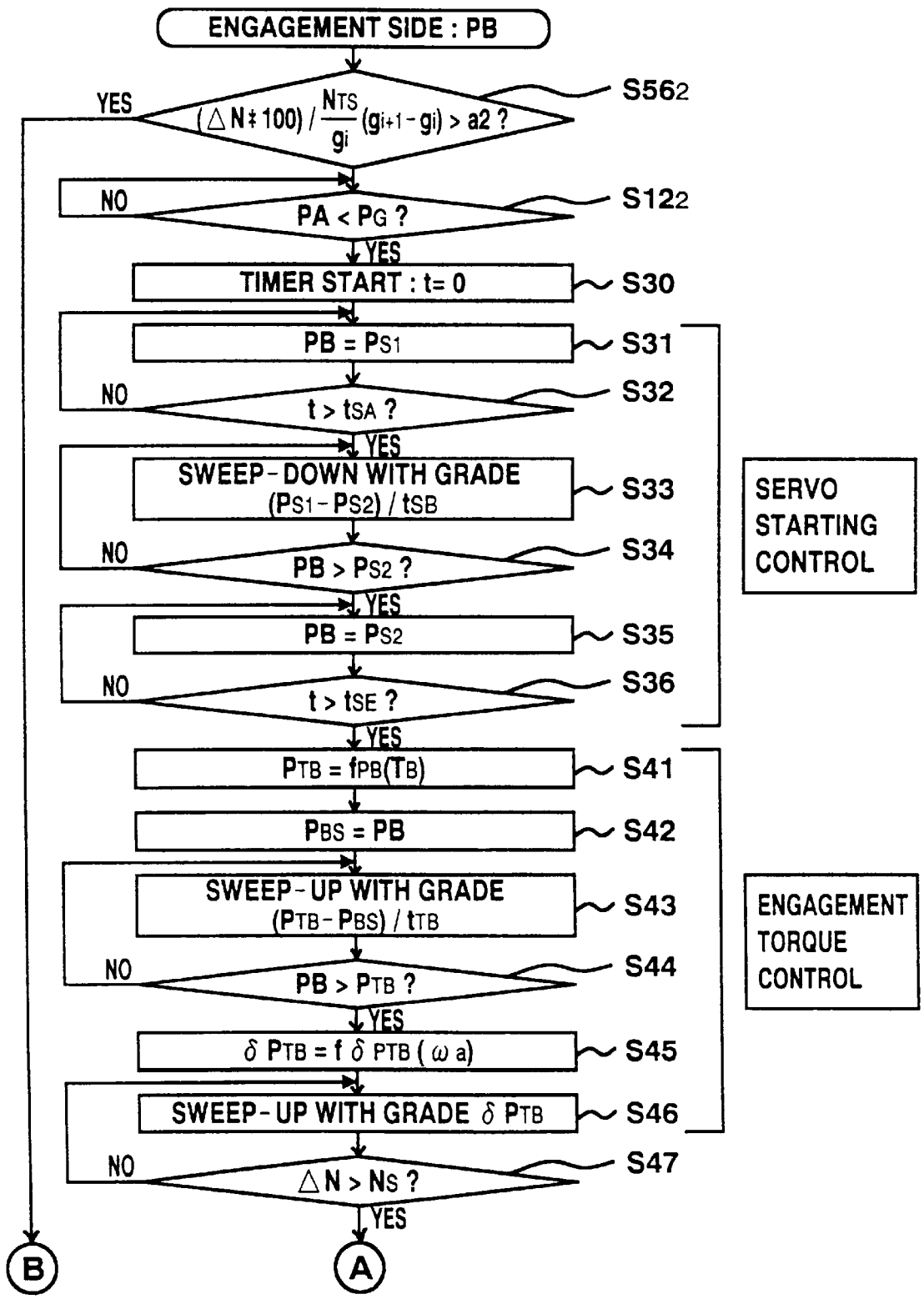
FIG. 20 is a flow chart showing a first portion of a control procedure for an engagement pressure in a down shift.
Figure 21:
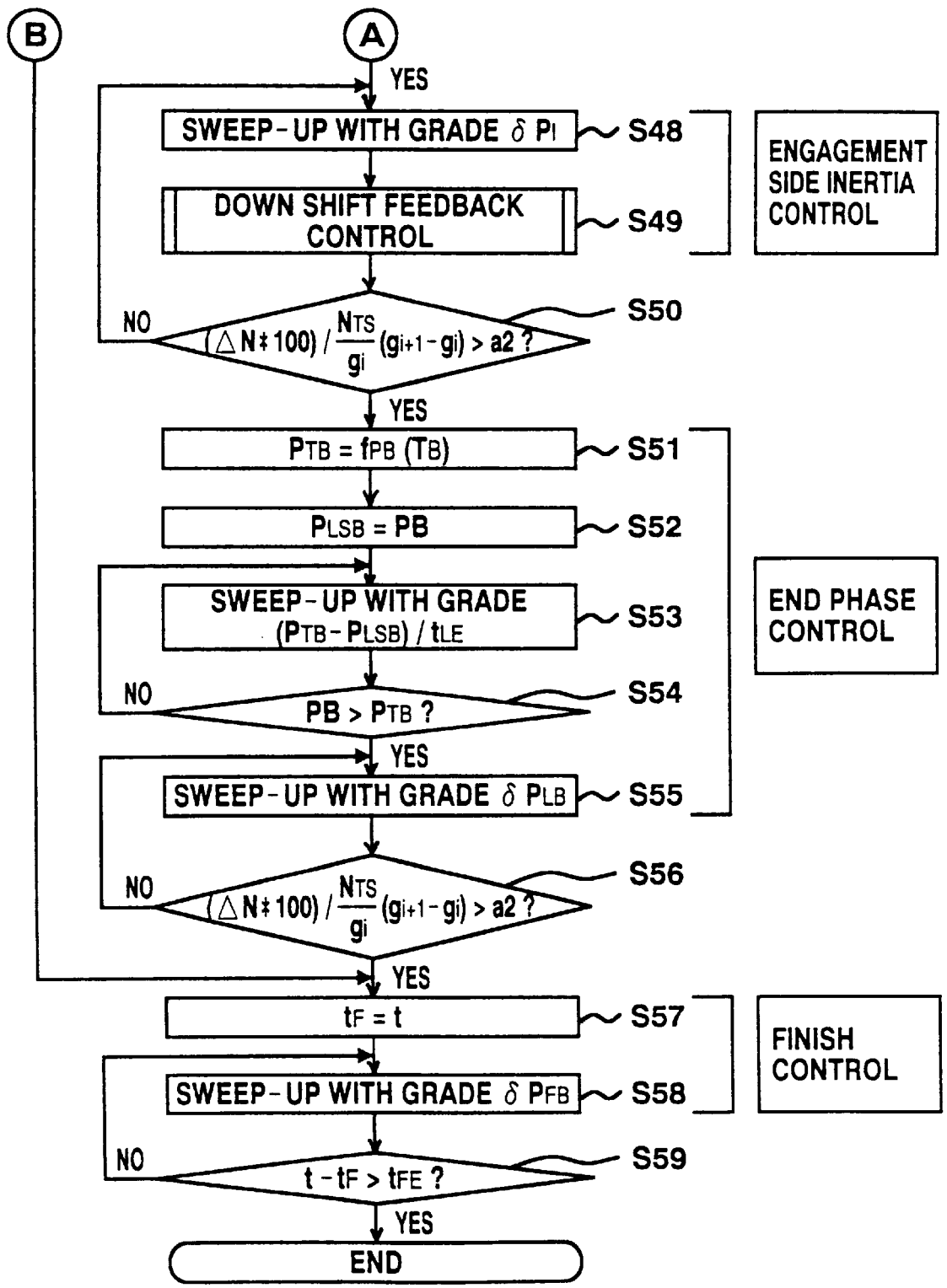
FIG. 21 is a flow chart showing a second portion of a control procedure for engagement pressure continued from FIG. 20.

Next, a control for an engagement side pressure PB in the down shift employing the one-way clutch, such as the one-way clutch F1, to control the hydraulic pressure to the first brake B1 which is in parallel with the one-way clutch F1 in the shift from fifth ratio to fourth ratio is described with reference to FIG. 18, FIG. 20, and FIG. 21. Steps in portions of the procedure of FIGS. 20 and 21 have the same numbers as the steps in the procedure of FIGS. 7–9 to indicate that these similar numbered steps are similar, and a specific description of these similar numbered steps is omitted.

First, the relative input shaft rotation speed (gear ratio) increases due to the control for the disengagement side pressure PA. In the control of the engagement side pressure, it is determined whether a2% (for example, 90%) of complete relative rotation speed change amount in the shift from fifth gear ratio to fourth gear ratio is achieved (S56$_2$). When the relative input shaft rotation speed change amount ΔN is found to be greater than a2%, the power-on state is determined. Then, control of the engagement side pressure is not needed to change the relative input shaft rotation speed (gear ratio), and the finish control (S57, S58) is performed immediately. In this case, the torque capacity of the direct clutch C2 to increase the relative input shaft rotation speed is decreased by controlling the release of the disengagement side pressure PA for the direct clutch C2. When the relative input shaft rotation speed is increased to the rotation speed (basic point) corresponding to the fourth gear ratio, the rotation speed of the sun gear S2 is reduced. Then, when the rotation speed of the sun gear S2 reaches zero and attempts to change to the opposite direction, the one-way clutch F1 operates, automatically, to prevent the rotation of the sun gear S2 in the opposite direction. Then with the operation of the brake B1 the down shift is ended.

When the relative input shaft rotation speed change amount has not exceeded a2% at step S56$_2$, the power-off state is determined, and the disengagement side pressure PA is compared with the spring load PG of the hydraulic servo B-1. Then, when the disengagement side pressure PA is decreased lower than the spring load (PA<PG) by, for example, the sweep-down of the disengagement side pressure PA with the predetermined grade $\delta P_I$ (S12$_2$), a timer is started (S30), and the state in which the shift control is performed mainly by controlling the disengagement side pressure PA is changed to a state in which the shift control is performed mainly by controlling the engagement side pressure PB. In this latter state, the solenoid valve Sol2 is changed from ON to OFF (to the closed state). to change the M2 shift valve 59 from the state shown on left-half side in FIG. 17 to the state shown on right-half side in FIG. 17. The application pressure based on the control pressure from the linear solenoid valve SLS is applied to the engagement side hydraulic servo (B-1). This application pressure is applied to the disengagement side hydraulic servo (C-1) before the change of the M2 shift valve. Then, the down shift is processed by controlling the engagement side pressure PB applied to the engagement side hydraulic servo B-1.

In the engagement side pressure control, the servo starting control (S31 through S36), the engagement side torque control (S42 through S47), the engagement side inertia control (S48 through S50), the end phase control (S51 through S56), and the end control (S57 through S59) are performed as in the case of the previously described clutch to clutch shift. But the engagement control (S37 through S39) is not performed because the disengagement side pressure PA is already lower than the spring load at step S122 and the engagement side torque is not calculated based on the disengagement side pressure. If the non-performed engagement control steps are in the software for the control logic, these steps are bypassed.

Figure 22:
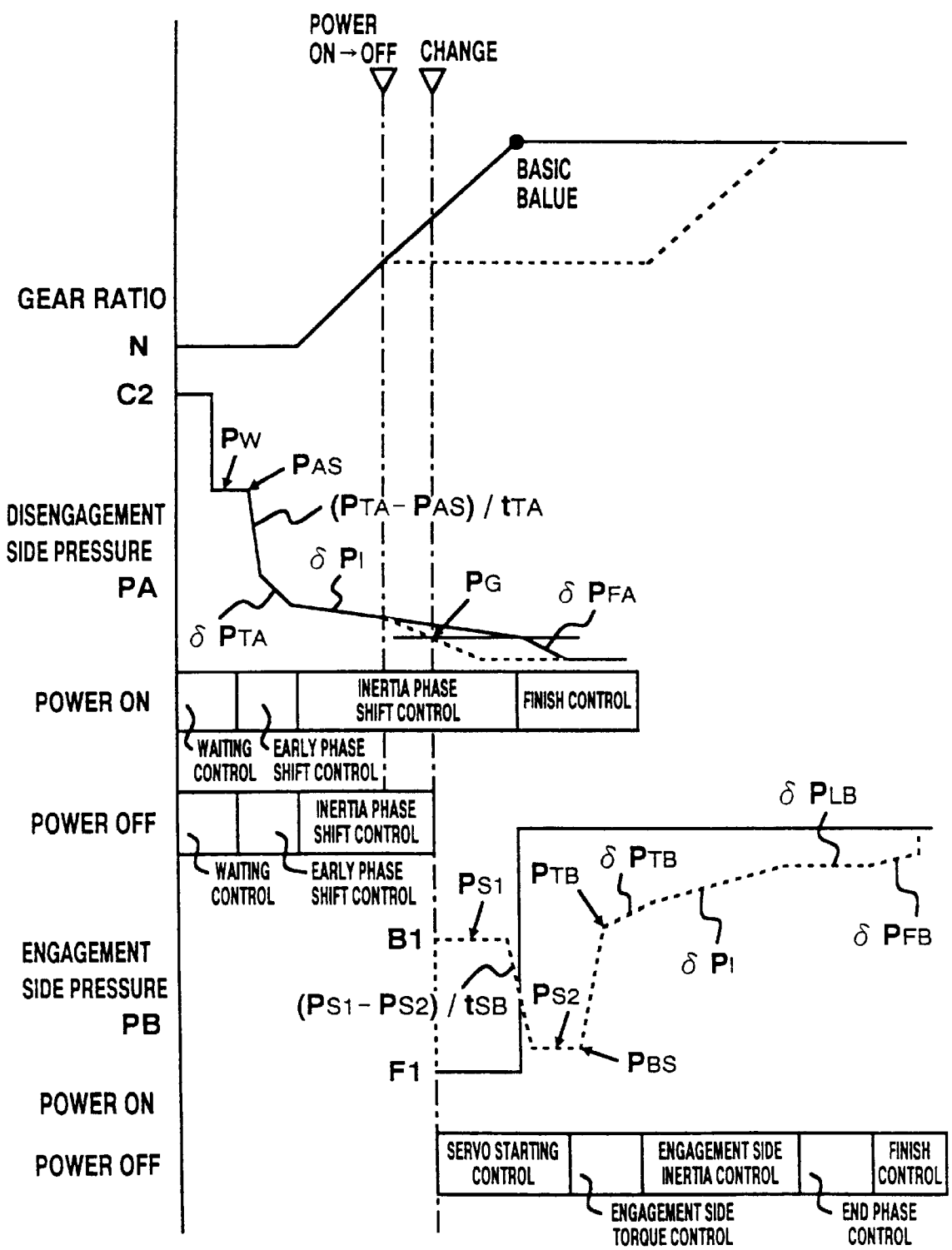
FIG. 22 is a time chart showing a down shift when a vehicle driving state is changed to a power-off state during a power-on state.

Next, a case where the vehicle driving state is changed from the power-on to the power-off state during a down shift in the power-on state is described with reference to FIG. 22. The down shift is from a fifth gear ratio to a fourth gear ratio performed by either a manual operation or the depression of the accelerator pedal for rapid acceleration, and the change to the power-off state is produced by the release of the accelerator pedal during the downshift.

Figure 13:
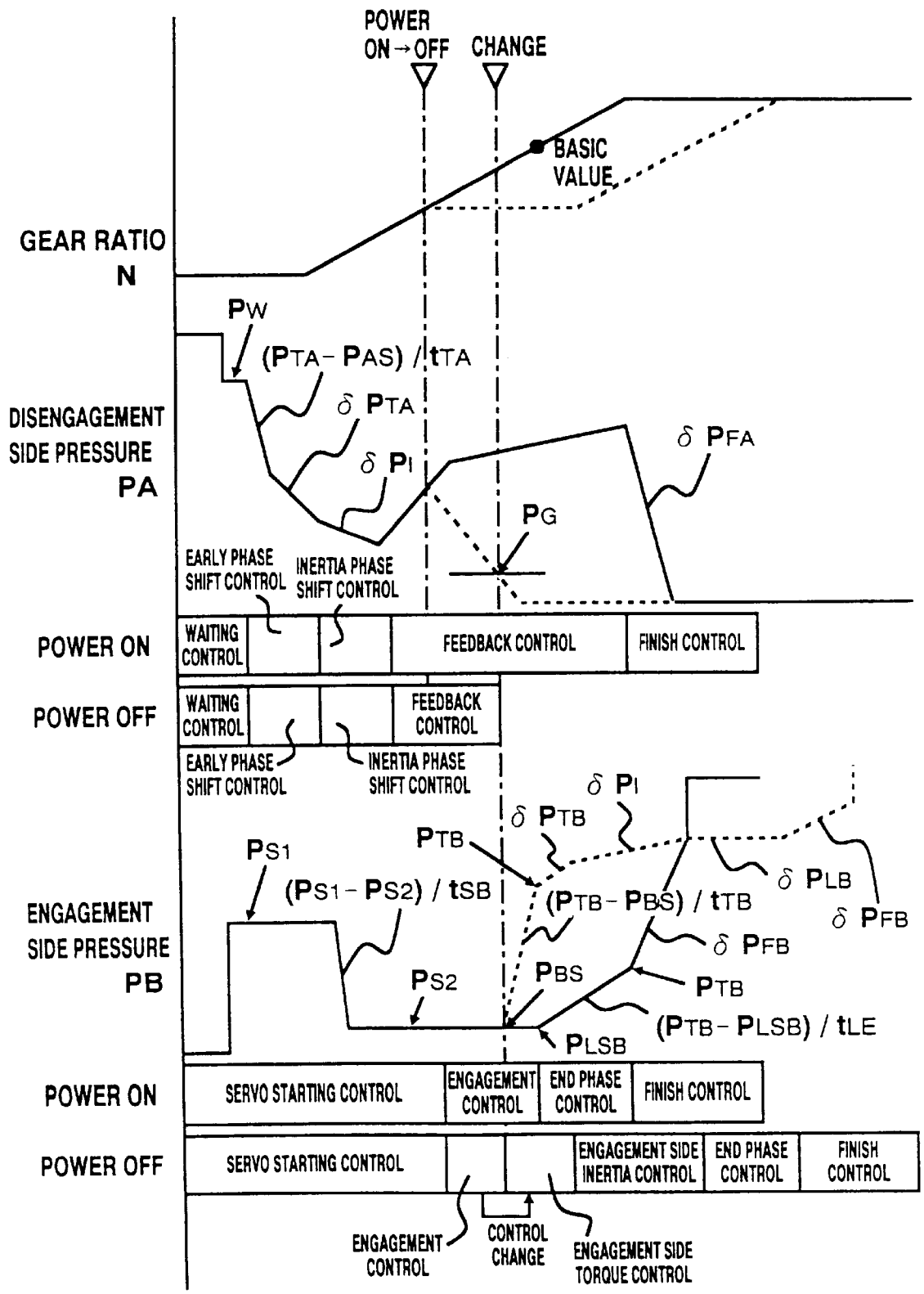
FIG. 13 is a time chart showing a down shift when a vehicle driving state is changed to a power-off state during a power-on state.

The change from the power-on to the power-off state is performed similar to the above described the clutch to clutch shift shown in FIG. 13. At first, the waiting control with the waiting disengagement pressure $P_W$ and the early phase and inertia phase controls by the sweep-down with the grades $(P_{TA}-P_{AS})/t_{TA}$, $\delta P_{TA}$ and $\delta P_I$ are performed as shown with the solid line because the down shift is performed in the power-on state where control is mainly by control of the disengagement side pressure. When the vehicle driving state is changed to the power-off state during the inertia phase control in which the sweep-down with a comparatively gentle grade $\delta P_I$ is performed, the disengagement side pressure PA continues to be reduced even though the increase in the relative input shaft rotation speed (gear ratio) N is discontinued as shown with the dotted lines.

Then, when the disengagement side pressure PA is decreased below than the spring load $P_G$ (S12$_2$), the solenoid valve Sol2 is changed so that the application pressure based on the control pressure from the linear solenoid valve SLS is applied to the engagement side hydraulic servo B-1, and the shift control is changed so that subsequent change in the relative input rotational speed (gear ratio) is performed mainly by the engagement side control of the engagement side pressure PB. In FIG. 22, the solid lines illustrate pressures PA and PB if the power-on state were continued while the dashed lines indication pressures after changing to the power-off state.

Figure 14:
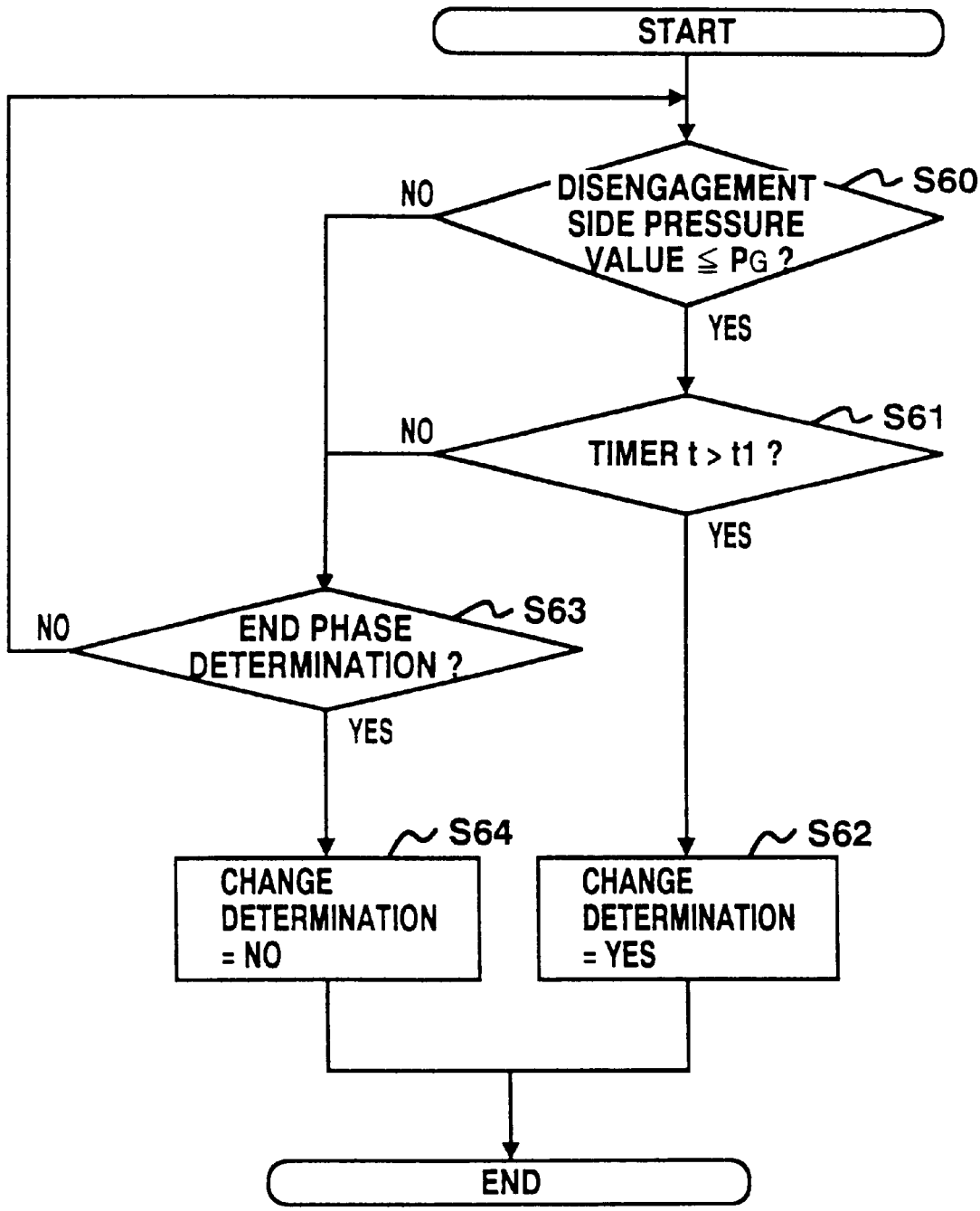
FIG. 14 is a flow chart showing a change determining procedure.
Figure 15:
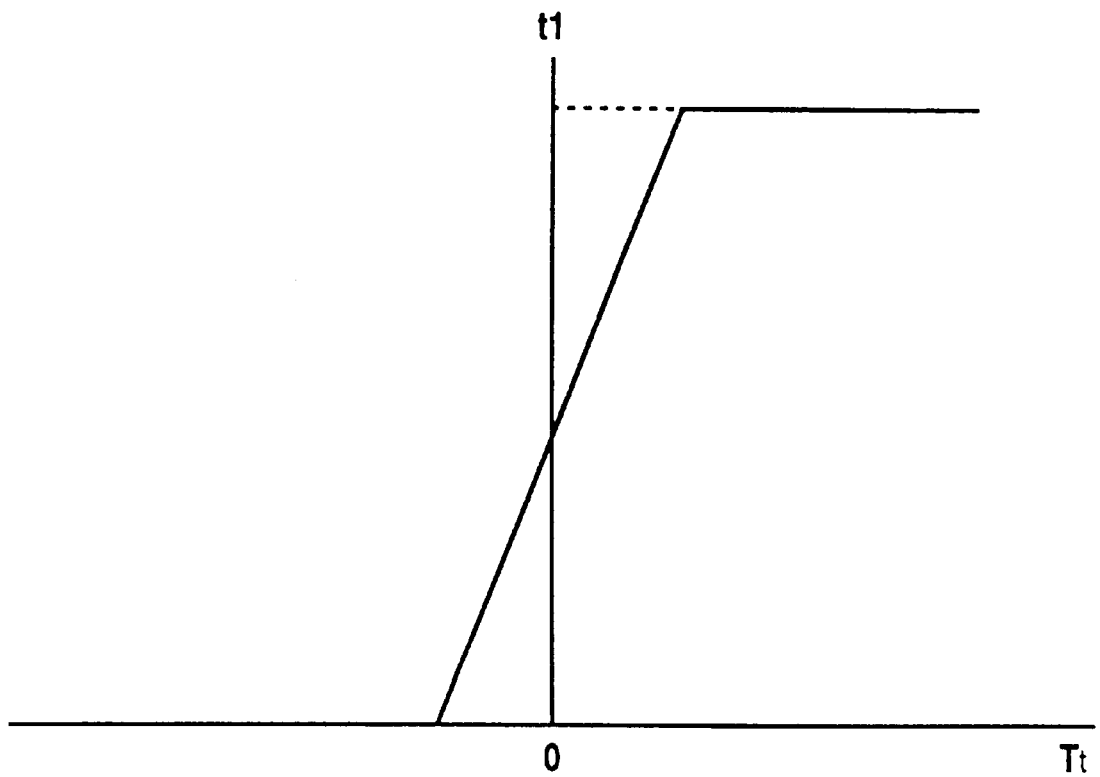
FIG. 15 is a graph showing a change of a dead time when the disengagement side pressure is decreased to lower than a spring load pressure.
Figure 16:
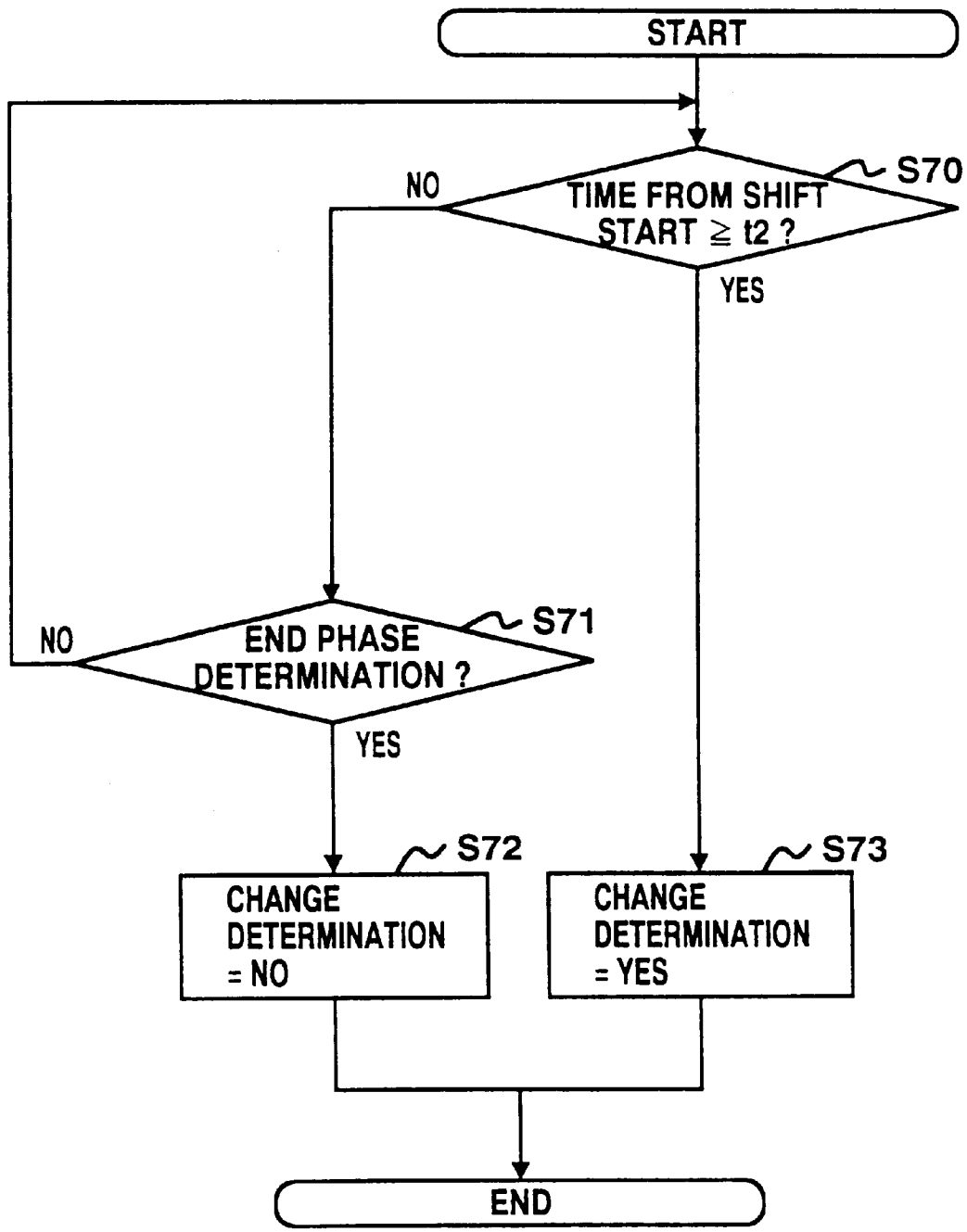
FIG. 16 is a flow chart showing another embodiment of a change determining procedure.

In a hydraulic control for the down shift employing a one-way clutch, the procedures of FIGS. 14 and 16 for determining a change in control of a down shift from the disengagement side control to the engagement side control could be performed as described above. In these cases, steps S63, S71 for end phase determination become true when an input shaft rotation speed (gear ratio) change amount $\Delta N$ of a2% is achieved.

Figure 23:
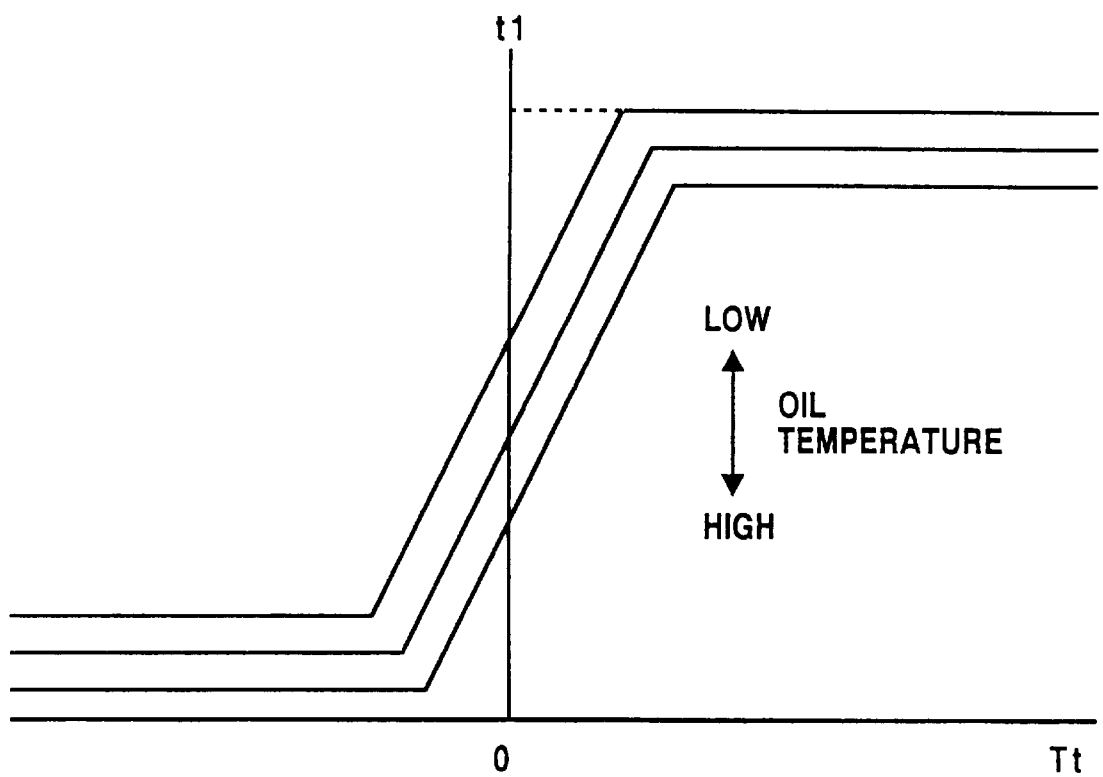
FIG. 23 is a graph showing a change in dead time in case the disengagement pressure is lower than the spring load.

In the change determination shown in FIG. 14 when the disengagement side pressure PA is lower than the spring load pressure $P_G$ (S60; YES), the timer for measuring the dead time t1 is started (S61). It is desirable that the dead time t1 measured by the timer is set as shown in FIG. 23. That is, the dead time t1 is changed based on the input torque $T_t$ as in the case shown in FIG. 15, and is changed based on the oil temperature because the hydraulic response changes with different oil temperatures. Because the dead time t1 is adjusted for oil temperature, a smooth down shift without tie-up is performed even when the oil temperature is low. The adjustment of the dead time t1 based upon the oil temperature can be applied for other cases of the clutch to clutch shift without one-way brake operation.

In the aforementioned hydraulic control, the input shaft rotation speed relative to the output rotation speed (gear ratio) is used in determining progress at various points in the down shift process. But other states or conditions of the transmission such as acceleration of the input shaft determined from successive readings of the input shaft rotation speed sensor 25 can be used. In the aforementioned hydraulic control, the progress of the down shift by the disengagement side controller is detected based on the disengagement side pressure or the time from the shift start. But some other state or condition in the transmission can be used.

What is claimed is:

1. A hydraulic control system for an automatic transmission having an input shaft for receiving power from an engine output shaft; an output shaft which is connected to vehicle wheels; and a plurality of selectively engageable and disengageable friction elements that determine a ratio of power transmission between the input shaft and the output shaft, said hydraulic control system comprising:

a plurality of hydraulic servos, corresponding to the friction elements, that engage and disengage the corresponding friction elements;

a hydraulic controller which controls hydraulic pressures applied to the hydraulic servos; and a control unit, which receives input signals from sensors indicating a vehicle driving state, comprising:

a disengagement side controller which outputs signals to said hydraulic controller to control a hydraulic pressure applied to one of the hydraulic servos for a first friction element of said plurality of friction elements, the first friction element being disengaged in a down shift to a predetermined gear ratio, an engagement side controller which outputs signals to said hydraulic controller to control a hydraulic pressure applied to another of the hydraulic servos for a second friction element of said plurality of friction elements, the second friction element being engaged in the down shift to the predetermined gear ratio, a shift progress detector which detects a shift parameter indicative of actual progress of the down shift, a shift action detector which detects a changing control parameter of the down shift control by the disengagement side controller, and a change determiner which determines if the detected shift parameter indicates progress of the down shift to an extent of fulfilling a predetermined condition of the down shift in response to said shift action detector detecting a predetermined state of the control parameter and which chances primary control of the down shift from the disengagement side controller to the engagement side controller upon determining that the predetermined condition of the downshift is not fulfilled.

2. The hydraulic control system for an automatic transmission according to claim 1, wherein the engagement side controller performs a feedback control based on an amount of change of an input rotation speed relative to an output rotation speed when the change determiner changes primary control from the disengagement side controller to the engagement side controller.

3. The hydraulic control system for an automatic transmission according to claim 1, wherein the disengagement side controller performs a waiting control in which the disengaging friction element maintains a torque capacity which is a function of an input torque, and a duration for the waiting control is reduced when the input torque is increased.

4. The hydraulic control system for an automatic transmission according to claim 1, wherein the hydraulic pressure applied to the hydraulic servo for the disengaging friction element and the hydraulic pressure applied to the hydraulic servo for the engaging friction element are controlled by the respective disengagement side controller and engagement side controller.

5. The hydraulic control system for an automatic transmission according to claim 1 wherein the automatic transmission includes a one-way clutch in parallel with the engaging friction element, and wherein the down shift to the predetermined gear ratio is performed by disengaging the disengaging friction element, and engaging the engaging friction element or by operation of the one-way clutch and engaging the engaging friction element.

6. The hydraulic control system for an automatic transmission according to claim 5, wherein:

said disengagement side controller and said engagement side controller are integrated into a single hydraulic controller; and the change determiner changes a communication of the hydraulic pressure controlled by the single hydraulic controller from the hydraulic servo for the disengaging friction element to the hydraulic servo for the engaging friction element.

7. The hydraulic control system for an automatic transmission according to claim 1, wherein:
the shift progress detector detects the shift parameter of the down shift based on an amount of change in one or more of the input signals during the down shift;
the shift action detector detects, as the changing control parameter of the down shift, the hydraulic pressure applied to said one hydraulic servo; and
the change determiner determines that the predetermined state of the control parameter is fulfilled when the hydraulic pressure applied to said one hydraulic servo for the disengagement element is less than a predetermined pressure and determines that the predetermined condition of the down shift is not fulfilled when the amount of change in one or more of the input signals indicates that the shift parameter is less than a basic value.

8. The hydraulic control system for an automatic transmission according to claim 7, wherein
the disengagement side controller calculates the hydraulic pressure applied to the one hydraulic servo for the friction element being disengaged based on an input torque.

9. The hydraulic control system for an automatic transmission according to claim 7, wherein
the shift progress detector detects the amount of change of an input rotation speed signal relative to an output rotation speed signal.

10. The hydraulic control system for an automatic transmission according to claim 7, wherein
the disengagement side controller performs a feedback control which controls the hydraulic pressure applied to the one hydraulic servo for the disengaging friction element based on the amount of change in the one or more input signals.

11. The hydraulic control system for an automatic transmission according to claim 7, wherein
the engagement side controller performs an engagement control in which the hydraulic pressure increases to a target engagement pressure calculated based on a torque allotted to the engaging friction element, and performs an end phase control which is started when the amount of change in the one or more input signals indicates the progress of the down shift reaches a predetermined value.

12. The hydraulic control system for an automatic transmission according to claim 7, wherein
the engagement side controller performs a feedback control based on an amount of change of an input rotation speed signal relative to an output rotation speed signal in response to the change determiner changing primary control of the down shift from the disengagement side controller to the engagement side controller.

13. The hydraulic control system for an automatic transmission according to claim 7, wherein
the disengagement side controller performs a waiting control in which the disengaging friction element maintains a torque capacity which is a function of an input torque, and
a duration for the waiting control is reduced when the input torque is increased.

14. The hydraulic control system for an automatic transmission according to claim 7, wherein
the predetermined pressure for the disengaging friction element is a load value of a return spring in the hydraulic servo for the disengaging friction element.

15. The hydraulic control system for an automatic transmission according to claim 7, wherein
the change determiner includes a dead time which is increased based upon the input torque when the input torque is increased and which extends from a state in which the hydraulic pressure applied to the hydraulic servo for the disengaging friction element decreases to a value less than a predetermined pressure to a state in which the change is determined.

16. The hydraulic control system for an automatic transmission according to claim 15, wherein
the dead time is changed based on an oil temperature.

17. The hydraulic control system for an automatic transmission according to claim 1, wherein
the shift progress detector detects the shift parameter of the down shift based on an amount of change in one or more of the input signals during the down shift,
the shift action detector detects, as the changing control parameter of the down shift, an elapsed time from start of the down shift control, and
the change determiner determines that the predetermined state of the control parameter is fulfilled when a predetermined time has elapsed from start of the down shift control and determines that the predetermined condition of the down shift is not fulfilled when the amount of change in one or more of the input signals indicates that the shift parameter is less than a basic value.

18. The hydraulic control system for an automatic transmission according to claim 17, wherein
the disengagement side controller performs a control which calculates the hydraulic pressure applied to the hydraulic servo for the disengaging friction element based on an input torque.

19. The hydraulic control system for an automatic transmission according to claim 17, wherein
the amount of change indicating the shift parameter of the down shift is an amount of change of an input rotation speed signal relative to an output rotation speed signal.

20. The hydraulic control system for an automatic transmission according to claim 17, wherein
the disengagement side controller performs a feedback control which controls the hydraulic pressure applied to the hydraulic servo for the disengaging friction element based on the amount of change in one or more of the input signals during the down shift.

21. The hydraulic control system for an automatic transmission according to claim 17, wherein
the engagement side controller performs an engagement control in which the hydraulic pressure increases to a target engagement pressure calculated based on a torque allotted to the engaging friction element, and performs an end phase control which is started when the amount of change in one or more of the input signals indicates that the shift parameter of the down shift reaches a predetermined value.

22. The hydraulic control system for an automatic transmission according to claim 17, wherein
the engagement side controller performs a feedback control based on an amount of change of an input rotation speed signal relative to the output rotation speed signal when the change determiner changes primary control of the down shift from the disengagement side controller to the engagement side controller.

23. The hydraulic control system for an automatic transmission according to claim 17, wherein the disengagement side controller performs a waiting control in which the disengaging friction element maintains a torque capacity which is a function of an input torque, and a duration for the waiting control is reduced when the input torque is increased.

24. The hydraulic control system for an automatic transmission according to claim 17, wherein the predetermined time from the start of the down shift control is a target shift time which is set in advance based on the vehicle driving state.

25. A recording medium used for a hydraulic control system for an automatic transmission including an input shaft which receives input power from an engine output shaft, an output shaft which is connected to vehicle wheels, and a plurality of frictional engagement elements that change a power transmission ratio between the input shaft and the output shaft, wherein the hydraulic control system includes hydraulic servos that engage and disengage the frictional engagement elements; said recording medium being readable by a computer which receives input signals from a plurality of sensors indicating vehicle driving circumstances and outputs hydraulic control signals to a hydraulic controller for controlling hydraulic pressures applied to the hydraulic servos; said recording medium including recorded computer programs for performing:

a disengagement side control which controls the hydraulic pressure applied to one of the hydraulic servos for a first of the frictional engagement elements which is disengaged in a down shift to a predetermined gear ratio, responsive to the hydraulic control signals;

an engagement side control which controls the hydraulic pressure applied to another of the hydraulic servos for a second of the frictional engagement elements which is engaged in the down shift to the predetermined gear ratio, responsive to the hydraulic control signals;

a shift progress detecting procedure which detects a a shift parameter indicative of actual progress of the down shift based on the inputs from the sensors; and a shift action detection routine which detects a changing control parameter of the down shift control by the disengagement side controller;

a change determining procedure which determines if the detected shift parameter indicates progress of the downshift to an extent of fulfilling a predetermined condition of the down shift in response to the shift action detector detecting a predetermined state of the control parameter and which changes primary control of the down shift from the disengagement side controller to the engagement side controller upon determining that the predetermined condition of the down shift is not fulfilled.

26. A hydraulic control system for an automatic transmission having an input shaft for receiving power from an engine output shaft; an output shaft which is connected to vehicle wheels; and a plurality of selectively engageable and disengageable friction elements that determine a ratio of power transmission between the input shaft and the output shaft, said hydraulic control system comprising:

a plurality of hydraulic servos, corresponding to the friction elements, that engage and disengage the corresponding friction elements; and a hydraulic controller which controls hydraulic pressures applied to the hydraulic servos; and a control unit, which receives input signals from sensors indicating a vehicle driving state, comprising:

a disengagement side controller which outputs signals to said hydraulic controller to control a first hydraulic pressure applied to one of the hydraulic servos for a first friction element of said plurality of friction elements, the first friction element being disengaged in a down shift to a predetermined gear ratio, an engagement side controller which outputs signals to said hydraulic controller to control a second hydraulic pressure applied to another of the hydraulic servos for a second friction element of said plurality of friction elements, the second friction element being engaged in the down shift to the predetermined gear ratio, a shift progress detector which detects a shift parameter indicative of actual progress of the down shift, a shift action detector which detects a changing control parameter of the down shift control by the disengagement side controller;

a change determiner which determines if the detected shift parameter indicates progress of the down shift to an extent of fulfilling a predetermined condition of the down shift in response to said shift action detector detecting a predetermined state of the control parameter and which changes down shift control of the engagement side controller from a first control pattern to a second control pattern upon determining that the predetermined condition of the downshift is not fulfilled, wherein said first and second control patterns are for the same range of elapsed time in said control by said engagement side controller, wherein, in said first control pattern, said engagement side controller controls said second hydraulic pressure at a predetermined low level which does not engage said second friction element and then raises said second hydraulic pressure responsive to a determination that the predetermined condition of the down shift is fulfilled, and wherein, in said second control pattern, said engagement side controller raises said second hydraulic pressure to engage said second friction element without waiting for a determination that the predetermined condition of the down shift has been fulfilled.

27. The hydraulic control system for an automatic transmission according to claim 26 wherein the predetermined condition is fulfilled when a predetermined time has elapsed from a shift control start and a change in one or more of the input signals indicates that the shift parameter is less than a basic value.

28. The hydraulic control system for an automatic transmission according to claim 26, wherein the shift process detector detects the shift parameter of the down shift based on an amount of change in one or more of the input signals during the down shift, the shift action detector detects as the changing control parameter of the downshift, elapsed time from start of the downshift control, and the change determiner determines that the predetermined condition is not fulfilled when a predetermined time has elapsed from start of the downshift control and the amount of change indicates that the shift parameter is less than a basic value.

29. The hydraulic control system for an automatic transmission according to claim 26, wherein:

the shift parameter is detected as a change in one or more of the input signals received during the downshift;

the control parameter is the hydraulic pressure applied to said one hydraulic servo;

the predetermined condition is fulfilled when the hydraulic pressure applied to said another hydraulic servo for the disengagement element is less than a predetermined pressure and said change in said one or more input signals indicates that the shift parameter is less than a basic value.

* * * * *

UNITED STATES PATENT AND TRADEMARK OFFICE
CERTIFICATE OF CORRECTION

PATENT NO. : 6,068,576　　　　　　　　　　　　　　　　Page 1 of 1
DATED : May 30, 2000
INVENTOR(S) : Tsutsui et al.

It is certified that error appears in the above-identified patent and that said Letters Patent is hereby corrected as shown below:

Title page,
Under the heading "References Cited", "Takiguichi", both instances, should read -- Takiguchi --.

Column 22,
Line 43, "S122" should read -- $S12_2$ --.

Column 24,
Line 19, "chances" should read -- changes --.

Signed and Sealed this

Thirtieth Day of October, 2001

Attest:

NICHOLAS P. GODICI
Attesting Officer　　Acting Director of the United States Patent and Trademark Office